US011890619B2

(12) United States Patent
Kelly et al.

(10) Patent No.: US 11,890,619 B2
(45) Date of Patent: Feb. 6, 2024

(54) SAMPLE AND REAGENT CONTAINERS WITH ANTI-VACUUM FEATURE

(71) Applicant: Integra Biosciences AG, Zizers (CH)

(72) Inventors: Terrence Kelly, Lowell, MA (US); Jonathan Harkins, Bedford, NH (US); George Kalmakis, Gloucester, MA (US); Gary Nelson, Hollis, NH (US)

(73) Assignee: Integra Biosciences AG, Zizers (CH)

( * ) Notice: Subject to any disclaimer, the term of this patent is extended or adjusted under 35 U.S.C. 154(b) by 93 days.

(21) Appl. No.: 17/308,392

(22) Filed: May 5, 2021

(65) Prior Publication Data

US 2021/0260575 A1 Aug. 26, 2021

Related U.S. Application Data

(63) Continuation of application No. 16/002,624, filed on Jun. 7, 2018, now Pat. No. 11,033,903.
(Continued)

(51) Int. Cl.
*B01L 3/00* (2006.01)
*B01L 3/02* (2006.01)

(52) U.S. Cl.
CPC ............. *B01L 3/5082* (2013.01); *B01L 3/505* (2013.01); *B01L 3/508* (2013.01);
(Continued)

(58) Field of Classification Search
CPC .. B01L 3/5082; B01L 3/502707; B01L 3/505; B01L 3/508; B01L 3/50853; B01L 3/021; B01L 3/5027; B01L 2200/16; B01L 2300/028; B01L 2300/042; B01L 2300/0829; B01L 2300/0832;
(Continued)

(56) References Cited

U.S. PATENT DOCUMENTS

| | | | | |
|---|---|---|---|---|
| 3,819,505 | A * | 6/1974 | Parent | G01N 27/44756 422/430 |
| 4,774,057 | A | 9/1988 | Uffenheimer et al. | |

(Continued)

FOREIGN PATENT DOCUMENTS

| | | |
|---|---|---|
| CN | 102917795 | 2/2013 |
| EP | 1110613 | 6/2001 |

(Continued)

OTHER PUBLICATIONS

JP2019-565517, Notice of Reasons for Rejection dated May 31, 2022, 11 pages and English translation, 6 pages.
(Continued)

*Primary Examiner* — Benjamin R Whatley
*Assistant Examiner* — Jacqueline Brazin
(74) *Attorney, Agent, or Firm* — Andrus Intellectual Property Law, LLP

(57) ABSTRACT

Pipetting containers, such as reservoirs, reservoir liners, microplates, PCR plates, microtubes and PCR tubes, include anti-vacuum channels on the bottom wall of the receptacle to prevent a pipette tip vacuum engaging the wall during aspiration. The groupings of anti-vacuum channels are located on the bottom surface facing upward into the basin that holds liquid samples or reagents. The anti-vacuum channels also lower the required working volume for pipetting and reduce liquid waste.

9 Claims, 19 Drawing Sheets

Related U.S. Application Data

(60) Provisional application No. 62/516,842, filed on Jun. 8, 2017.

(52) U.S. Cl.
CPC ..... *B01L 3/50853* (2013.01); *B01L 3/502707* (2013.01); *B01L 3/021* (2013.01); *B01L 3/5027* (2013.01); *B01L 2200/16* (2013.01); *B01L 2300/028* (2013.01); *B01L 2300/042* (2013.01); *B01L 2300/0829* (2013.01); *B01L 2300/0832* (2013.01); *B01L 2300/0851* (2013.01); *B01L 2300/0858* (2013.01); *B01L 2300/16* (2013.01)

(58) Field of Classification Search
CPC ..... B01L 2300/0851; B01L 2300/0858; B01L 2300/16
USPC .......................................................... 422/549
See application file for complete search history.

(56) References Cited

U.S. PATENT DOCUMENTS

| | | | | |
|---|---|---|---|---|
| 5,837,203 | A | 11/1998 | Godec et al. | |
| 6,027,695 | A | 2/2000 | Oldenburg et al. | |
| 7,217,397 | B1 * | 5/2007 | Astle | B01L 3/50855 422/552 |
| 7,811,522 | B2 | 10/2010 | Mathus et al. | |
| 2002/0187079 | A1 | 12/2002 | Ringleben et al. | |
| 2005/0242963 | A1 | 11/2005 | Oldham | |
| 2008/0038839 | A1 | 2/2008 | Linder | |
| 2009/0008405 | A1 * | 1/2009 | Mathus | B01L 3/508 206/499 |
| 2009/0170183 | A1 | 7/2009 | Buechs | |
| 2009/0281250 | A1 | 11/2009 | DeSimone et al. | |
| 2010/0119417 | A1 | 5/2010 | Motadel | |
| 2011/0036862 | A1 | 2/2011 | Kanai et al. | |
| 2011/0143964 | A1 * | 6/2011 | Zhou | C07H 21/04 506/40 |
| 2011/0186570 | A1 | 8/2011 | Perry et al. | |
| 2011/0253222 | A1 | 10/2011 | Arai | |
| 2013/0134040 | A1 | 5/2013 | Lee | |
| 2014/0272935 | A1 * | 9/2014 | Dirckx | B01F 25/14 435/5 |
| 2014/0272989 | A1 * | 9/2014 | Knight | B01L 3/5085 435/6.12 |
| 2015/0335769 | A1 * | 11/2015 | Sugita | A61K 51/088 422/115 |
| 2015/0367341 | A1 | 12/2015 | Zhou | |
| 2016/0354782 | A1 * | 12/2016 | Zhou | B01L 3/502746 |
| 2017/0028400 | A1 | 2/2017 | Gaynor | |

FOREIGN PATENT DOCUMENTS

| | | | | |
|---|---|---|---|---|
| EP | 1110613 | A1 * | 6/2001 | B01L 3/021 |
| EP | 2259070 | | 12/2010 | |
| JP | 1977156980 | | 12/1977 | |
| JP | S60-107570 | | 6/1985 | |
| JP | 2005010179 | | 1/2005 | |
| JP | 2007089530 | | 4/2007 | |
| JP | 2008076274 | | 3/2008 | |
| JP | 2010532478 | | 10/2010 | |
| JP | 2013531553 | | 8/2013 | |
| JP | 2016518588 | | 6/2016 | |
| JP | 2016136969 | | 8/2016 | |
| WO | 2009054870 | | 4/2009 | |
| WO | 2011/140063 | | 11/2011 | |

OTHER PUBLICATIONS

JP2019-565522, Notice of Reasons for Rejection dated May 31, 2022, 17 pages and English translation, 6 pages.
AU2018279083, Examination Report dated Jun. 2, 2022, 2 pages.
CN202110988830.X, Office Action and English Translation dated Jun. 7, 2022, 14 pages.
AU2018280186—Australian Examination Report No. 1 dated Jul. 29, 2022, 4 pages.

* cited by examiner

SAMPLE AND REAGENT CONTAINERS WITH ANTI-VACUUM FEATURE

FIELD OF THE INVENTION

The invention relates to clinical and research laboratory products, and in particular, pipetting containers such as reagent reservoirs, liners, microtubes, PCR tubes, PCR plates and microplates.

BACKGROUND OF THE INVENTION

Automated and semi-automated liquid handling systems often include pipetting heads for either 96 or 384 disposable pipette tips. A 96 pipetting head has an array of 8 by 12 tip mounting shafts with the centerline spacing between the adjacent shafts being 9 mm. A 384 pipetting head has an array of 16 by 24 mounting shafts with the centerline spacing between the adjacent shafts being 4.5 mm. The spacing is set by ANSI/SLAS Microplate standards (formerly known as SBS format). The American National Standards Institute/Society for Laboratory Automation and Screening (ANSI/SLAB) has adopted standardized dimensions for microplates:

- ANSI/SLAS 1-2004: Microplates—Footprint Dimensions
- ANSI/SLAS 2-2004: Microplates—Height Dimensions
- ANSI/SLAS 3-2004: Microplates—Bottom Outside Flange Dimensions
- ANSI/SLAS 4-2004: Microplates—Well Positions
- ANSI/SLAS 6-2012: Microplates—Well Bottom Elevation These standards have been developed to facilitate the use of automated liquid handling equipment with plastic consumable products from different manufacturers. Automated or semi-automated liquid handling systems having a matrix of fewer mounting shafts such as a 24 pipetting head or more mounting shafts such as a 1536 pipetting head are also used in the field, although the most common are the 96 and 384 heads. These automated or semi-automated liquid handling systems are typically designed with platforms located underneath the pipetting head, which contain one or more nesting locations for microplates, racks of microtubes or reservoirs for holding samples or reagents. In the art, microplates are sometimes referred to as well plates, and microtubes are sometimes referred to a sample tubes. The nests are sized in accordance with the outside dimensions for microplates for the SBS standard (now ANSI/SLAS) in order to align each of the 96 or 384 pipette tips with the center points of the respective wells in the microplate on the platform.

As mentioned, reservoirs for holding samples or reagents can also be configured to be placed on the platform in the nest. Reservoirs typically have a common basin instead of individual wells and are known to have either a flat bottom or a patterned bottom in order to reduce residual liquid waste. It is also known to use a disposable reservoir liner to avoid the need to clean and/or sterilize reservoirs before starting a new procedure. In addition to automated and semi-automated systems, handheld pipettes are used to draw reagents or samples from reservoirs, microplates or microtubes. One reservoir kit that uses a liner is disclosed in U.S. Pat. No. 7,811,522 entitled "Sample Reservoir Kits with Disposable Liners" and issuing on Oct. 12, 2010 to Mathus et al., incorporated herein by reference, is particularly well suited for use with handheld pipettes. Many reservoirs and liners are made of polystyrene which is naturally hydrophobic. The hydrophobic surface causes liquid to bead up and pool during final aspiration which is generally thought to facilitate liquid pick up and reduce the residual volume.

One problem that has been found to occur with the use of reservoirs or disposable reservoir liners is that one or more of the mounted pipette tips may engage the surface of the liner bottom when the pipette head is lowered. A pipette tip engaged with the surface of the bottom wall can unfortunately create a vacuum within the tip when the head aspirates. The vacuum within the tip increases as aspiration continues and the orifice is eventually closed off. This situation can lead to inaccurate pipetting, but can also lead to contamination of the pipetting head which is a serious issue. When a pipette tip that has vacuum engaged the bottom wall releases, the reagent or sample, now driven by a significant pressure difference, often sprays upward beyond the pipette tip and the mounting shaft into the respective piston cylinder. If this occurs, it may be necessary to disassemble, clean and sterilize the entire pipette head.

The problem of pipette tips possibly engaging the bottom of a container and forming a vacuum during aspiration can also occur in reservoirs without liners, or in other containers typically used for pipetting such as microtubes or microplates. In all of these applications, it is often desirable to reduce residual volume or liquid hang-up in the container when attempting to fully aspirate all the liquid from the container. To this end, pipette tips are typically lowered as close to the bottom wall of the container without contacting the bottom wall as reasonably possible in order to reduce the residual volume of liquid that cannot be aspirated. In multichannel pipetting systems, even automated multi-channel systems where the height of the pipetting head can be controlled precisely, one or more pipette tip orifices can become misaligned with the other tip orifices because, for example, a pipette tip is mismounted or deformed. Tip misalignment can lead to the tip engaging the bottom wall and forming a vacuum. Even if all of the pipette tips are aligned properly, it is possible that the portions of bottom wall in the container or container(s) corresponding to the locations of the pipette tips are not precisely aligned on a plane level with the pipette tip orifices. This sort of unevenness can occur, e.g., when one or more microtubes are not completely seated in the tube rack, or when a liner is not fully seated in a reservoir base or is slightly deformed, and can also lead to one or more pipette tips engaging the bottom wall when trying to aspirate the final volume from the container.

SUMMARY OF THE INVENTION

The invention relates primarily to the placement of anti-vacuum channels on the bottom wall of receptacles in pipetting containers used in clinical and research laboratory products, such as laboratory reservoirs for liquid samples and reagents, reservoir liners, microtubes, PCR tubes, microplates and PCR strips and plates. The use of the anti-vacuum channels enables a pipette tip to engage the bottom wall of the receptacle without allowing vacuum pressure to accumulate within the tip while aspirating. Suitably sized ribs can be used for this purpose as well; however, use of anti-vacuum channels has been found to be particularly well suited for also reducing dead volume when pipetting residual liquid from the container. The capillary action of the channels tends to draw the liquid into the respective groupings of channels, and this reduces the minimum required working volume for the receptacle because the pipette tip is able to draw liquid from the channels at any location within the respective channel grouping. Connecting groupings of channels fluid dynamically has been found to further reduce dead volume and the minimum working volume in some applications.

In a first exemplary embodiment of the invention, a laboratory reservoir kit has a disposable liner that is held within a reusable reservoir base. The kit is configured to be used with a hand-held pipette, e.g. a multi-channel pipette having disposable pipette tips mounted along a line. The reusable reservoir base provides a stable support on a flat surface, such as a laboratory bench top. The base has an elongated basin including a pair of end walls, a longitudinal trough extending along a bottom surface of the basin and a pair of longitudinal sidewalls extending between the end walls. The longitudinal sidewalls slant outward as the sidewall extends upward to form a portion of the basin, with the trough at the bottom of the sidewalls.

The disposable liner also has a pair of longitudinal sidewalls and a longitudinal trough extending between end walls to define at least one liner basin in which liquid sample or liquid reagent is held for pipetting. A peripheral flange extends outward from a top of the liner basin such that the peripheral flange rests on a rim of the reusable base when the disposable liner is set in place within the reusable base. A plurality of anti-vacuum channels is located on an upper surface of the liner trough and exposed upwardly into the liner basin in which liquid sample or liquid reagent is held for pipetting. The liner trough desirably has a rounded cross section to accommodate the linear placement of groupings of anti-vacuum channels longitudinally along the bottom of the trough. Desirably, each grouping of anti-vacuum channels includes at least one pair of intersecting channels and the liner includes additional channels that extend between groupings in order to connect adjacent groupings fluid dynamically. As mentioned, connecting the groupings of channels can help to reduce residual dead volume or lower the minimum working volume, especially when the wettability of the liner is appropriately selected, e.g. by treating polystyrene or polypropylene with corona treatment or otherwise. It is preferred that the treatment be sufficient to render the measured surface tension of the bottom wall of the liner greater than or equal to about 72 dynes, which is the surface tension for natural water. Polypropylene is not as stiff as polystyrene but may be desired in certain applications because it provides better chemical resistance.

In some embodiments, the liner can include one or more walls spanning between the longitudinal sidewalls of the liner, to create separate basins in the liner.

The liner is made of transparent plastic, and an inside surface of the sidewall of the basin on the reusable base has distinct liquid volume graduation marks. The liquid volume graduation marks on the sidewall of the basin are calibrated to measure a volume of liquid sample contained in the one or more basins of the disposable liner and are observable through the transparent disposable liner when the disposable liner is set in place within the reusable base.

In other exemplary embodiments of the invention, a laboratory reservoir kit with a disposable liner and a reusable reservoir base is configured with anti-vacuum channels for use with SBS formatted 96 or 384 pipetting heads. Desirably, in these embodiments the reusable reservoir base has outside flange dimensions compatible with nests configured to hold SBS-formatted well plates and reservoirs (i.e. ANSI/SLAS 3-2004: Microplates—Bottom Outside Flange Dimensions). If the reservoir is made to be used with a 96 pipetting head, the disposable liner contains a matrix of 96 groupings of anti-vacuum channels with a center point for each grouping spaced 9 mm from the center point of adjacent groupings, consistent with SBS (ANSI/SLAS) formats. If the disposable liner is designed to be used with a 384 pipetting head, the liner desirably contains a matrix of 384 groupings of anti-vacuum channels with the center point for each grouping spaced 4.5 mm from the center point of adjacent groupings, again consistent with SBS (ANSI/SLAS) formats. The disposable liner can also be made with more or less groupings depending on the intended use of the liner; however, in each case the groupings should be centered at the center point at which it is expected that the respective pipette tips on the pipetting head may contact the liner. In some embodiments, the liner contains a matrix of 96 groupings of anti-vacuum channels with adjacent center points spaced 9 mm apart, as well as a matrix of 384 groupings of anti-vacuum channels having center points spaced apart 4.5 mm. In this manner, the liner is configured to be used both with a 96 pipetting head or a 384 pipetting head.

The groupings of the anti-vacuum channels can take on various configurations in accordance with the invention. The goal is to provide a channel configuration that will provide a fluid accessible void underneath the orifice of the respective pipette tip even if the pipette tip is somewhat off center, which can occur in an automated pipetting system, for example, when a pipette tip is not mounted straight or the tip is slightly deformed. One desired grouping configuration includes a first pair of perpendicular and intersecting channels with the intersection of the channels defining a center point for the grouping, and a second pair of perpendicular channels rotated 45° from the first pair where the second pair of channels are aligned to intersect at the center point but are interrupted in the vicinity of the center point. It is desirable that the channels have a constant width and a constant depth, and that the width of the channels is selected so that the distance across the intersection is less than the outside orifice diameter of the smallest sized pipette tips that will likely be used with that liner. For example, if a 12.5 μl pipette tip has an outside orifice diameter of 0.61 mm, then the width of the channels should be less than 0.50 mm to ensure that the distal end of the pipette tip cannot fit into the channels at the intersection which may result in creating a vacuum. For a 384 application, the desired channel width using the above described grouping configuration is also 0.50 mm. Likewise, for a 96 head application, the desired width is 0.50 mm. The grouping may also have other channels located away from the center point towards the perimeter of the grouping in order to provide a larger region covered by anti-vacuum voids in the event that the pipette tip orifice is off center because of how the tip is mounted or constructed, or in the event it is used with a hand-held pipette. In one embodiment, the channel grouping includes a third pair of parallel linear channels spanning between the second pair of perpendicular channels and crossing the first pair of perpendicular intersecting channels. In another embodiment, a circular channel intersects each of the first and second pair of channels.

In most embodiments for SBS-formatted pipetting heads, the bottom wall of the disposable liner is otherwise flat, and the groupings of anti-vacuum channels are located at the center point for either a 96 pipetting head or a 384 pipetting head configuration or both. In other embodiments, the bottom wall of the disposable liner is patterned with an array of recesses in either the 96 or the 384 configuration. A grouping of anti-vacuum channels is located within each recess. Ridges are formed at the interfaces of the adjacent recesses, and the low point of each of the multiple recesses in the bottom of the wall of the liner lies in a common plane.

The recesses desirably have a curvature in the shape of a partial sphere, although other configurations are possible in accordance with the invention.

The disposable liner desirably is made of a transparent plastic material, such as clear molded and corona treated polystyrene or polypropylene (surface tension greater than or equal to 72 dynes/cm), and has a shape that closely follows the contour of the basin of the reusable base, in part to facilitate viewing of liquid volume graduation marks on the side walls of the base. Also desirably, the side walls of the reusable reservoir base have distinct liquid volume graduation marks on the surface of the side wall forming a portion of the basin. These liquid volume graduation marks are calibrated to measure a volume of liquid sample contained in the transparent disposable liner and are observable when the disposable liner is set in place within the reusable base. Further, one or more sides of the reusable base may contain one or more viewing windows so that a user can easily view the amount of liquid contained in the disposable liner, the printed graduations and the location of the pipette tips in relation to the anti-vacuum groupings. The viewing window can be a narrow window or it can be relatively wide as long as the base still has enough support for the disposable liner.

In some circumstances, it may be desirable to provide one or more upstanding walls in the liner between rows or columns of the groupings of anti-vacuum channels. Walls sealed at the bottom of the liner can be molded into the liner, and effectively separate the contained volume into multiple basins for liquid reagent or liquid samples. The walls can also serve as a splashguard. Alternatively, a removable baffle or splashguard, having upstanding walls between two or more rows or columns of the groupings of anti-vacuum channels can be used, without sealing at the bottom wall of the liner. In this configuration, the splashguard does not separate the liner basin into separate sealed volumes or basins.

In another embodiment, the invention is directed to a reservoir, designed to be used without a liner, and further configured with anti-vacuum channels on the bottom wall to prevent pipette tips from vacuum engaging the bottom wall of the reservoir. The bottom wall has a generally rectangular shape configured to enable a matrix of pipette tips to aspirate liquid from the volume in the liner basin. The reservoir is preferably made from molded polystyrene that is corona treated or otherwise treated to increase the wettability of the bottom wall. The reservoir desirably has an outside flange dimensioned in accordance with the SBS format. It is possible that the anti-vacuum channels extend over the entire bottom wall of the reservoir basin, however it is preferred that the bottom wall include a matrix of groupings of anti-vacuum channels. For reservoirs designed to be used with 96 channel pipetting heads, it is desirable for the reservoir to include a matrix of 96 groupings of anti-vacuum channels with the center point for each grouping spaced 9 mm from the center point of adjacent groupings. For reservoirs designed to be used with 384 pipetting heads, it is desirable for the bottom wall of the reservoir to have a matrix of 384 groupings of anti-vacuum channels with a center point for each grouping spaced 4.5 mm from the center point of adjacent groupings. The geometry in the dimensions of the anti-vacuum channels and grouping of channels is suitably the same or similar to that described in connection with the reservoir liners above.

In one particularly desirable embodiment, the bottom wall of the reservoir contains both a matrix of 96 groupings with 9 mm spacing and a matrix of 384 groupings with 4.5 mm spacing, and it is further desirable that each of the 96 groupings shares one or more channels with 4 groupings of the 384 anti-vacuum channel groupings.

In an alternative reservoir embodiment, the bottom wall of the reservoir is patterned with recesses, instead of flat, and includes grouping of anti-vacuum channels located within each recess. In another alternative embodiment, the reservoir includes at least one sealed wall between two adjacent rows of anti-vacuum channel grouping or between two adjacent columns of anti-vacuum channel groupings in order to separate the reservoir basin into separate volumes. A splashguard not sealed at the bottom can also be used in connection with the reservoir.

Another embodiment of the invention is directed to a laboratory microtube that includes a receptacle for holding liquid reagents or samples and a removable cap for closing the microtube. In addition, the receptacle will typically have cylindrical sidewalls and a bottom wall, with at least a portion of the bottom wall being generally flat and horizontal. In accordance with the invention, the upper surface of the bottom wall has multiple anti-vacuum channels extending upwardly towards the volume in which the liquid sample or liquid reagent is held. The configuration and dimensions of the groupings of anti-vacuum channels is selected so that a void will be underneath the orifice of a tip pressed against the surface of the bottom wall at any point. The microtubes are desirably made of molded polypropylene, and it is desirable to corona treat or otherwise treat the tubes so that the bottom wall of the microtube has enhanced wettability; e.g., a surface tension of greater than or equal to 72 dynes which is the surface tension of natural water.

Microtubes are typically stored in racks, e.g. 96 tubes in an 8×12 array, and the tube height might be uneven. This can happen for example if one or more of the tubes are not completely seated in the rack. When this occurs, the pipette tip can press against the bottom wall of the tube. This can also occur if one or more pipette tips are mismounted, or if the pipetting system lowers the pipetting head too low into the microtubes in a rack. The anti-vacuum feature is useful to address each of these issues. Also, the anti-vacuum feature may be helpful when using a hand-held single channel pipette by allowing the user to engage the bottom wall of the tube without creating a vacuum engagement. The advantage of having the anti-vacuum feature when using a hand-held pipette is also applicable to use with reservoirs and reservoir liners.

In another embodiment, the invention is directed to a microplate, for example, an SBS formatted microplate having a plurality of separate wells arranged in columns and rows. Each well is configured to hold a separate volume of liquid sample or reagent, and has a generally flat bottom wall except for the anti-vacuum feature. In accordance with one embodiment, the upper surface of the bottom wall includes multiple anti-vacuum channels exposed upwardly toward the volume in which liquid sample or reagent is held in the well. The anti-vacuum channels provide a fluid accessible void underneath the orifice of a pipette tip even if the pipette tip engages the bottom wall of the well, for example in the event that a pipette tip is mismounted in an automated system or an automated system lowers the head too far. In one embodiment shown in the drawings, the microplate has a matrix of 96 wells arranged in an 8×12 array, and a grouping of anti-vacuum channels is located on the bottom wall of each well with a center point for the grouping spaced 9 mm from the center point of groupings in adjacent wells. In another embodiment shown in the drawings, the well plate includes a matrix of 384 wells in a 16×24 array, with a grouping of anti-vacuum channels in each well having center points spaced in 4.5 mm. In either case it is desirable that channels extend to or near the well side walls. The specific configuration and dimensions of the anti-vacuum channels and groupings of channels can be the same as described above with respect to the reservoir liners and used in the liner reservoir and microtube. Microplates are typically made of polystyrene. If the microplate is made of polystyrene or another material such as polypropylene, it is desirable that it be corona treated or otherwise treated so that the surface tension of the bottom walls of the wells is greater than or equal to 72 dynes/cm.

In the above embodiments, the anti-vacuum feature has been described as groupings of channels on the upper surface of a bottom wall of a pipetting container. The anti-vacuum feature can take other forms, however, such as the use of ribs extending upward from the upper surface of a bottom wall of a pipetting container. The use of anti-vacuum channels or ribs on the bottom well of the laboratory container provides a fluid accessible void even if a pipette tip engages the bottom wall of the container. This means that the pipette tip will not cause a vacuum within the tip while the pipette is aspirating. It also means that, as a practical matter, tips can be placed closer to the bottom wall of the container and/or engage the bottom wall of the container when doing so without the anti-vacuum feature would more likely cause vacuum engagement. In turn, with the ability to move the pipette tip orifice very close to or into engagement with the bottom wall of the container, the pipetting system is able to withdraw liquid from the container with significantly less residual volume. In addition, without being limited to a theory of operation, it is believed that the hydrophilic nature of the corona treated surface causes liquid on the surface to self level, while the channels provide surface tension features that accumulate liquid on the surface. The result is that the liquid draws naturally from the surface between the groupings of channels and forms segregated pools in and above the groupings of channels, as the liquid level is drawn down. This phenomenon effectively lowers the minimum working volume for reliable pipetting. This is particularly important for expensive, scarce or small volume samples or reagents. Accordingly, the use of channels has proven to be more effective than the use of ribs. Another advantage of using channels, is that additional channels can be added to fluid dynamically connect adjacent groupings of channels. The capillary action of the channels facilitates even distribution of liquid throughout the area of the connected channels, which further can promote lower minimum working volume.

Other features and advantages of the invention may be apparent to those skilled in the art upon reviewing the drawings and the following description thereof.

DETAILED DESCRIPTION

Figure 1:
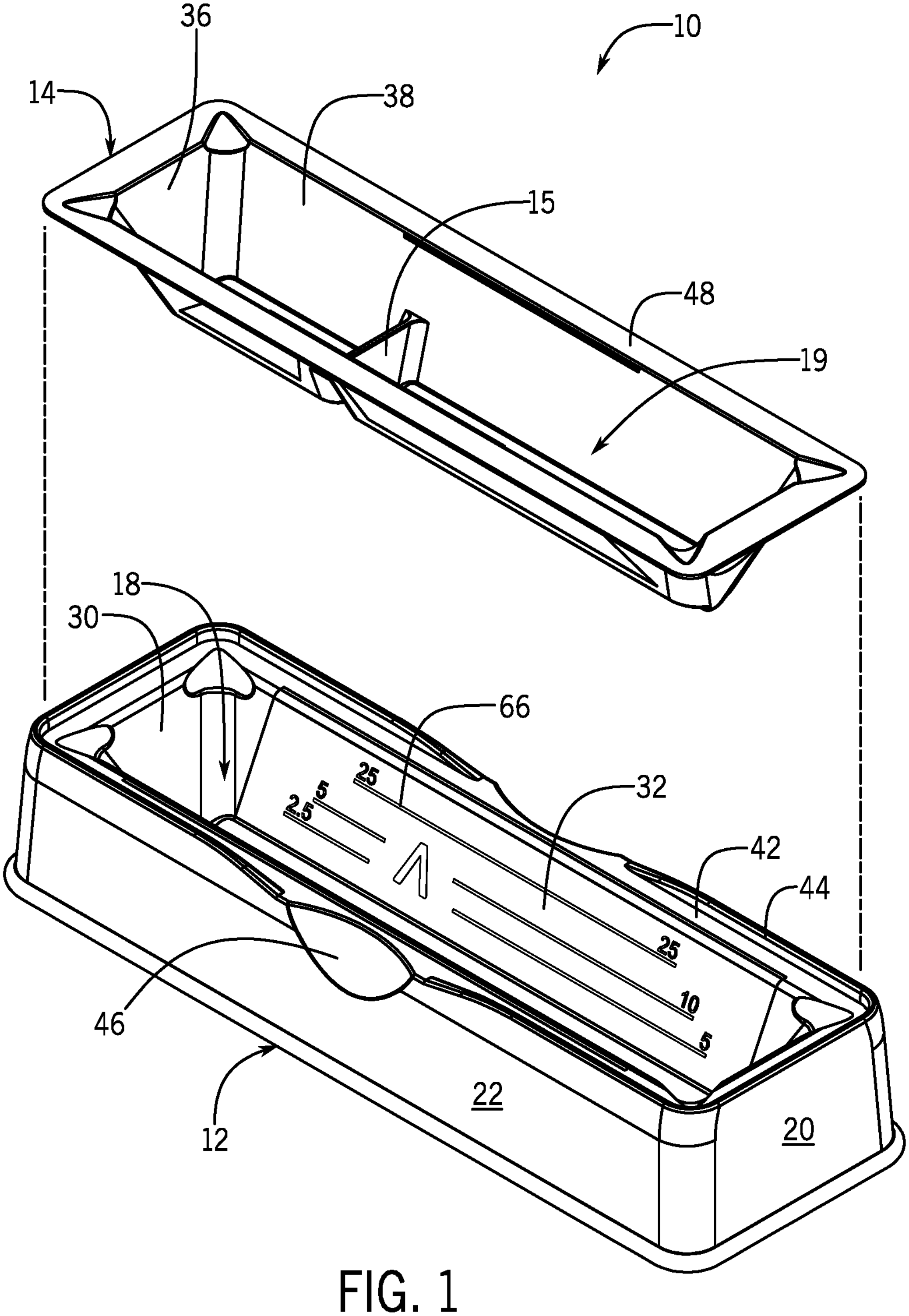
FIG. 1 is an exploded perspective view of a laboratory reservoir kit intended to be used with a handheld pipette and constructed in accordance with a first exemplary embodiment of the invention.

FIGS. 1-11 illustrate a laboratory reservoir kit 10 that is constructed in accordance with a first exemplary embodiment of the invention. The kit 10 includes a reservoir base 12 and a disposable liner 14. The kit 10 is designed to hold liquid sample or liquid reagent in disposable liner 14 for pipetting with a hand-held pipette using disposable pipette tips, when the disposable liner 14 is placed within the reusable reservoir base 12 as shown for example in FIG. 2. The kit 10 is designed to hold up to 25 ml of liquid sample or reagent, although the capacity of the liner 14 is sufficient to handle overfilling.

The reservoir base 12 contains a basin 18 into which the disposable liner 14 is placed. The contour of the disposable liner 14 generally follows the shape and contour of the basin 18 of the reusable base 12, except for a transverse wall 15 in the liner 14 which is discussed in more detail below. Outer sidewalls 22 and end walls 20 on the reusable base 12 provide support for the reservoir base 12 and its basin 18 on flat surfaces such as the laboratory bench top. While the reservoir base 12 can be made from a variety of materials, it is preferred that the base 12 be made of relatively rigid injection molded plastic having an opaque color, such as white ABS. It is preferred that the surface of the basin 18 have a satin finish. On the other hand, as mentioned above, it is preferred that the disposable liner 14 be made of clear transparent plastic with at least a portion of the surface being polished, such as clear injection molded polystyrene or polypropylene having a thickness of approximately 0.51 mils. The polished or shiny surface of the clear liner, in contrast to the satin finish on the opaque colored basin 18 in the base 12, renders it more conspicuous to laboratory workers whether or not the transparent liner 14 is present within the reservoir base 12. Injection molding is the preferred method for the liners 14 because it is desirable for the liner thickness to be constant throughout. It should be recognized, however, that other manufacturing means and thickness specifications may be possible for both the disposable liners and the reusable base 12.

Figure 2:
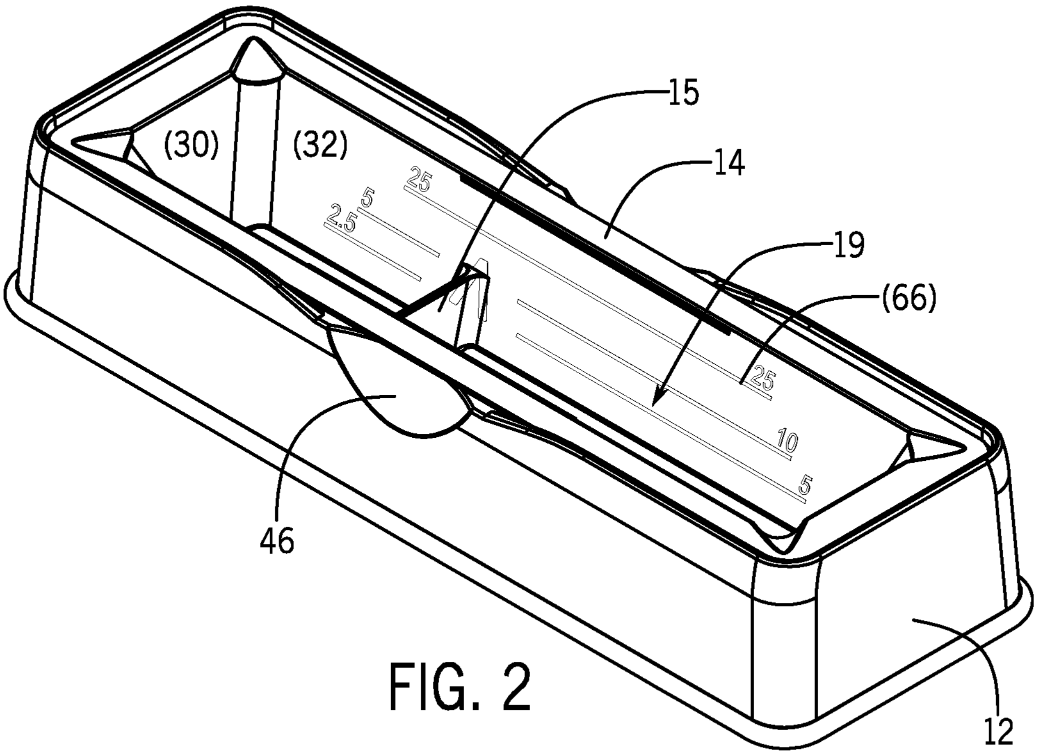
FIG. 2 is a perspective view of a reusable reservoir base with a disposable liner placed therein, both being configured in accordance with the embodiment of the invention shown in FIG. 1.
Figure 4:
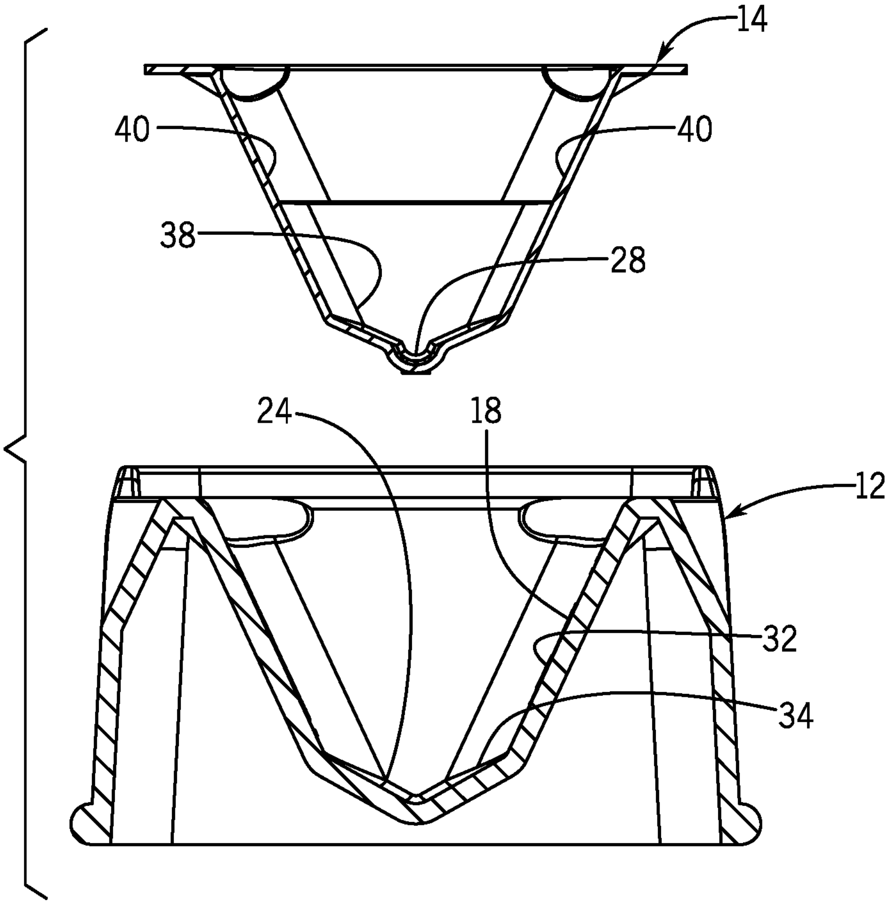
FIG. 4 is a cross-sectional view of the reusable reservoir base with the associated liner taken along section line 5-5 in FIG. 3 with the liner exploded away from the base.
Figure 5:
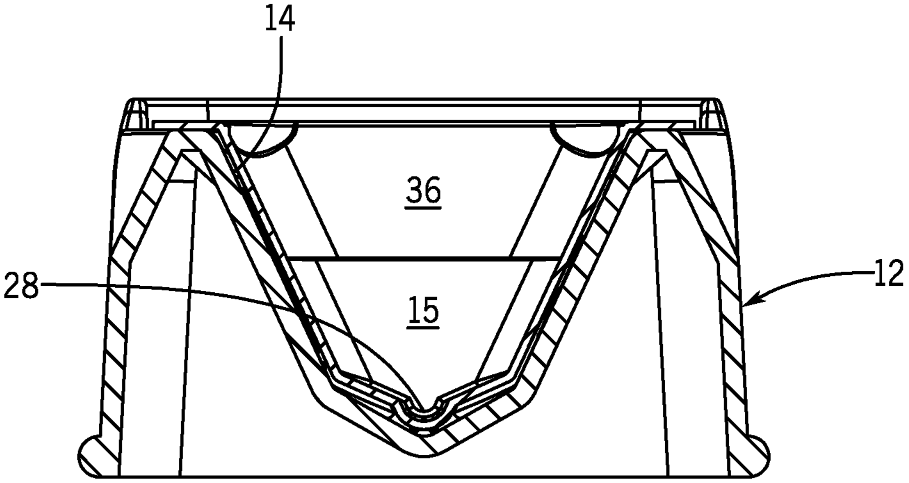
FIG. 5 is a cross-sectional view of the reusable reservoir base with the associated liner placed therein, as taken along line 5-5 in FIG. 3.
Figure 11:
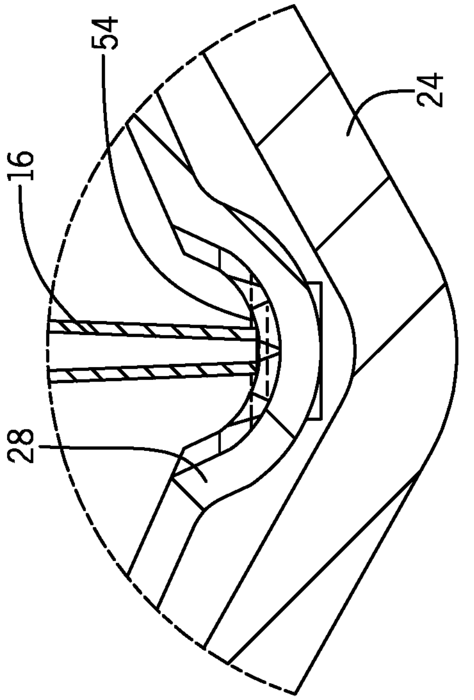
FIG. 11 is a schematic view of detailing a portion of the bottom wall of the reservoir liner with a pipette tip engaged to withdraw liquid.
Figure 10:
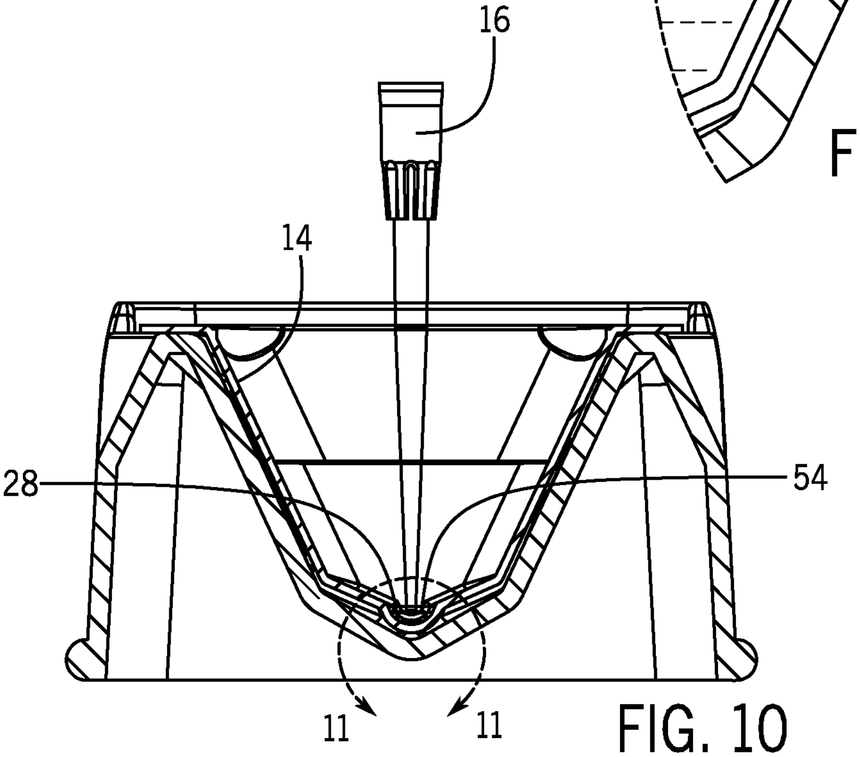
FIG. 10 is a view similar to FIG. 8 illustrating an aspirating pipette being used to aspirate liquid from a narrow longitudinal trough extending along the bottom of the basin of the disposable liner.

Referring now in particular to FIGS. 2 and 4, the basin 18 in the reusable base 12 includes a narrow longitudinal trough 24, FIG. 4 extending along its bottom surface 26. The disposable liner 14 also includes a basin 19 and a narrow longitudinal trough 28 divided into two sections which extend between the transverse wall 15 and the respective end walls of the disposable liner 14. Referring briefly to FIGS. 10 and 11, the trough 28 in the disposable liner reduces the amount of dead volume in the reservoir liner 14. FIGS. 10 and 11 show a pipette tip 16 accessing liquid 54 contained in the trough 28 of the liner 14. Referring again to FIG. 1, the basin 18 in the reusable base 12 includes a pair of end walls 30 and a pair of longitudinal sidewalls 32. The basin 18 also includes longitudinal steps 34, FIG. 4, each extending longitudinally along the respective side of the trough 24 and connecting the trough 24 to the respective sidewall 32 of the base 12. The use of the steps 34 allows the basin 18 to widen substantially over a very short depth in order to accommodate greater volumes, yet also allows for the presence of the narrow longitudinal trough 24 to reduce dead volume when the last vestiges of liquid are being aspirated. The disposable liner 14 has a matching configuration, with exception of the transverse wall 15 and divided basin 19. The liner 14 includes end walls 36 and longitudinal sidewalls 38. It also has sections of longitudinal steps 40 spanning between the longitudinal sidewalls 38 and a respective section of the trough 28 in the liner 14. The longitudinal steps 40 have a slight downward slope towards the centerline of the trough 28.

The reusable reservoir base 12 has an upper rim 42, FIG. 1, extending around the circumference of the top of the basin 18. Desirably, a raised lip 44 extends upward from the rim 42 substantially around the entire circumference of the upper rim 42 except for locations along opposed center portions of the longitudinal sidewalls 22 of the base 12. The base 12 includes molded indentations 46 at these locations, which allows the user to conveniently grasp the disposable liner 14 to lift the liner 14 from the base 12.

The disposable liner 14 includes a peripheral flange 48 that extends outwardly from the upper end of the basin 19 defined by the sidewalls 38 and end walls 36 of the disposable liner 14. The peripheral flange 48 of the disposable liner 14 rests on the upper rim 42 of the base 12 when the disposable liner 14 is placed within the base 12. The liner 14 can hang within the base 12 so that there is a slight clearance between the basin 18 in the base 12 and the disposable liner 14.

The dimensions for the disposable liner 14 are selected in order to provide ample volume for 25 ml of liquid sample or reagent, as well as provide a longitudinal trough length sufficient to accommodate conventional 8-channel and 12-channel handheld pipettes, e.g., at least 11 cm.

Figure 7:
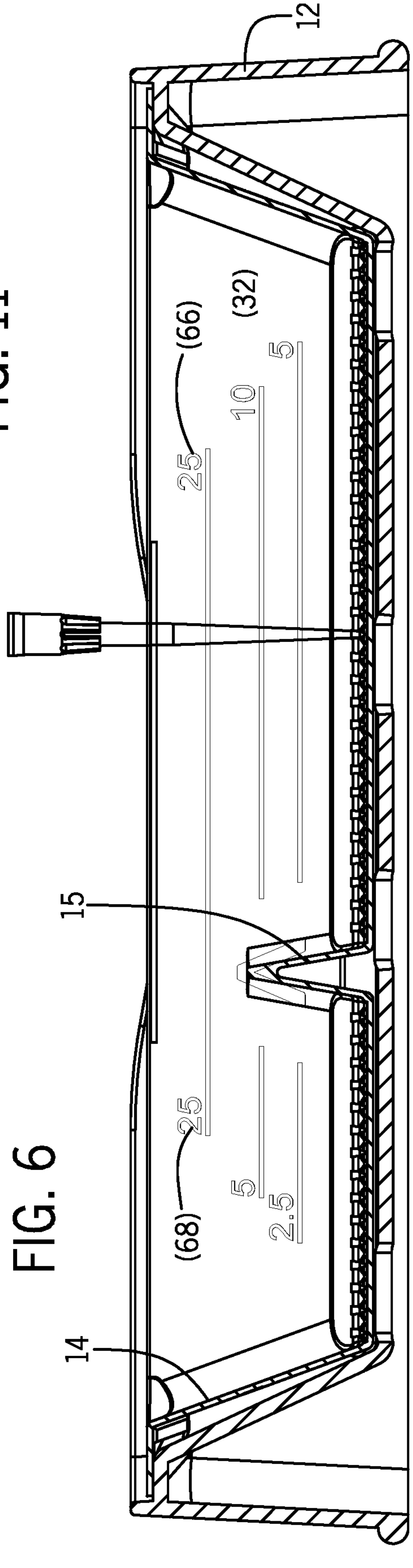
FIG. 7 is a longitudinal cross-sectional view of the reusable reservoir base shown in FIG. 2 with the disposable liner placed therein as taken along line 7-7 in FIG. 3.

One sidewall 32 of the basin 18 in the reusable base 12 contains liquid volume graduation marks 66. The liquid volume graduation marks 66 are preferably printed onto the sidewall 32, using pad printing or any other suitable process. The liquid volume graduation marks 66 on the sidewall 32 can be seen by the user through the clear, transparent liner 14 when the liner 14 is placed in the base 12. FIG. 2 shows the liner 14 placed in the base 12, and illustrates that the liquid volume graduation marks (66) on the basin sidewall of the base 12 can be viewed through the transparent plastic liner 14. The reference number (66) for the liquid graduation marks has been placed in parenthesis in the figures to indicate that the marks are actually on the opaque surface of the base 12 underlying the clear transparent liner 14. Likewise, reference numbers (32) and (30) indicating the side and end walls of the basin 18 in the base 12 underlying the transparent liner in these figures have been placed in parenthesis as well. Further, as shown in FIGS. 2 and 7, volume indicators (68) are printed on the basin sidewall (32) of the base 12. The reference number (68) are again placed in parenthesis in these figures to indicate that the volume amount indicators (68) are actually printed on the basin sidewall 32 of the base 12, but can be seen through the clear, transparent liner 14. The volume indicators (68) for the divided basin in the liner 14 are specific for the respective side to the wall 15 on the liner 14, and are accumulated above the wall 15. A 25 ml kit 10 may include the values (68) of 2.5, 5 ml for graduation marks corresponding to one side of the wall 15 on the liner 14 and 5, 10 ml next to graduation marks for the other side of the wall 15, assuming that that wall 15 divides the liner basin so that one side has half the volume of the other side. For locations corresponding to above the transverse wall 15 on the liner 14, the 25 ml kit 10 may include the value (68) of 25 ml for graduation mark. Since the kit 10 is intended to be used with the disposable liner 14 set in place within the base 12, the location of the graduation marks 66 is calibrated with respect to the volume of liquid contained within the disposable liner 14 when the disposable liner is in place, not with respect to the volume of the basin 18 of the base 12.

In fact, it is not desirable for the user to use the reusable reservoir base 12 as a stand-alone reservoir. The basin 18 in base 12 includes drainage openings in part to discourage the improper use of the reservoir base 12 as a stand alone reservoir without the use of a disposable liner 14. In addition, these holes prevent sticking of the disposable liners 14 to the reservoir base 12 should some liquid become located between the two surfaces.

Figure 8:
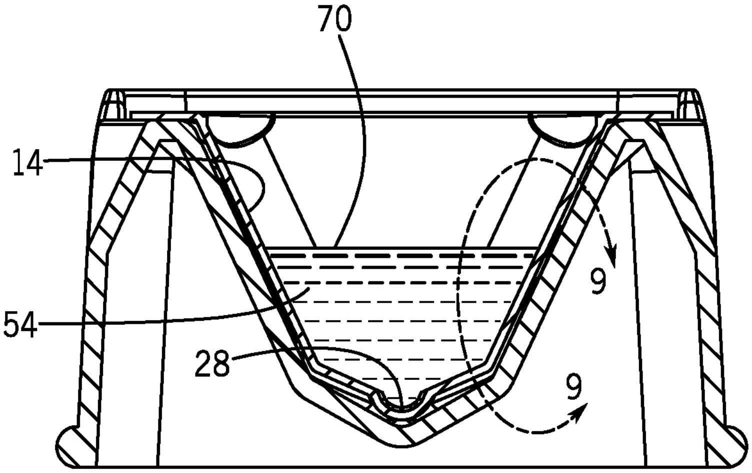
FIG. 8 is a schematic cross-sectional view similar to the view shown in FIG. 5 illustrating the reservoir kit having liquid sample or liquid reagent contained in the disposable liner.
Figure 9:
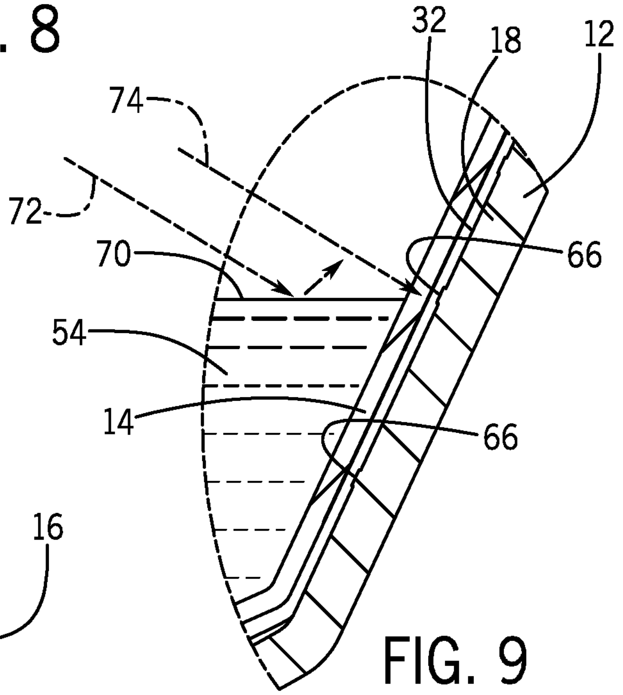
FIG. 9 is a detailed view of the area defined by lines 9-9 in FIG. 8 which illustrates the reflection of light by liquid contained within the disposable liner such that the view of volume graduation marks below the top surface of the liquid are blocked from view of a worker using the reservoir kit.

Referring now in particular to FIGS. 8 and 9, when liquid 54 is contained within the disposable liner 14, liquid volume graduation marks 66 below the surface 70 of the liquid 54 may be blocked from view to the user, depending on the user's angle of perspective. Arrows 72 and 74 in FIG. 9 illustrate this concept. Light traveling along the path indicated by arrow 72 is reflected from the top surface 70 of the liquid 54 (e.g., water) and thus prevents the user from seeing graduation marks 66 below the top surface 70 of the water 54. On the other hand, the user can view the graduation marks 66 above the surface 70 of the water as depicted by arrow 74. Thus, it is preferred that the volume indicators 68 on the basin sidewall 32 of the base 12 be printed at or above the calibrated liquid volume graduation marks 66 to which they are associated. This makes the liquid level easier to read.

Figure 3:
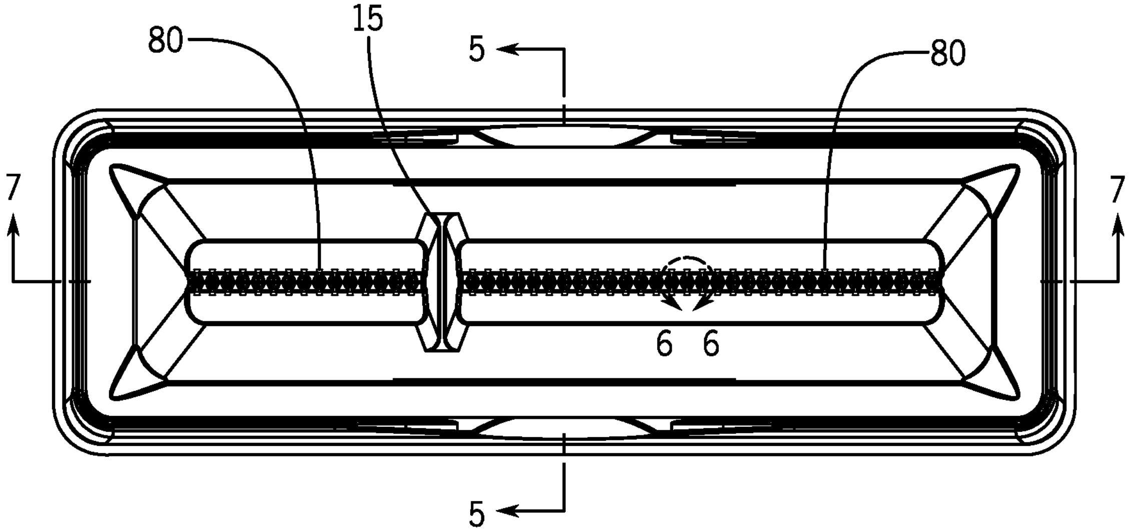
FIG. 3 is a top view of the reusable reservoir base with the disposable liner placed therein as shown in FIG. 2.
Figure 6:
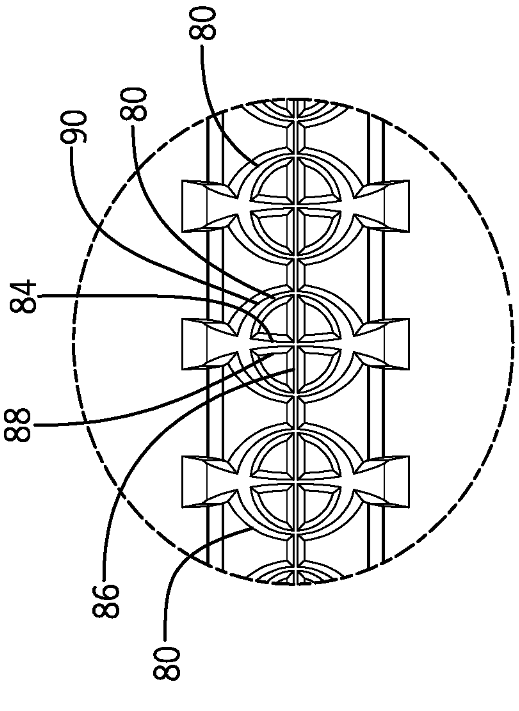
FIG. 6 is a detailed view of the area of liner depicted by the region 6-6 in FIG. 3.

FIGS. 10 and 11 illustrate the liquid in the liner 14 drawn down to a low liquid level. In accordance with the invention, the pipette tip 16 is pressed down and engaged against the liner 14 in the liner trough 28. The trough 28 desirably has a circular or rounded cross section as illustrated in FIGS. 10 and 11 to facilitate the use of groupings 80 of anti-vacuum channels on the upper surface of the liner trough 28. Referring now to FIGS. 6 and 3, a plurality of groupings 80 of anti-vacuum channels 80 are located on the upper surface of the liner trough 28, and are exposed upwardly into the liner basin 19 in which liquid sample or liquid reagent is held for pipetting. The groupings 80 are disposed linearly along the liner trough 28 and run along the low point of the trough 28. Each channel grouping 80 includes perpendicular intersecting channels 84, 86 which intersect at a center point 88, see FIG. 6. A circular channel 90 having a center at the center point 88 intersects the perpendicular channels 84, 86. In this embodiment, the center points 88 are spaced at 2.25 mm, corresponding to one half of the distance of the spacing between SBS formatted 384 pipette tips. In addition, one set of channels 86 lies along the longitudinal middle of the trough 28, with the other set of perpendicular channels lying transverse. These longitudinal channels 86 extend to the adjacent groupings 80 in order to fluid dynamically connect the adjacent groupings 80 and channel fluids between adjacent groupings 80. In order to minimize residual dead volume, it is desirable to make the liner 14 of molded polystyrene or polypropylene and corona treat or otherwise treat the surface rendering it more hydrophilic, thereby providing a surface on which the liquid tends to spread rather than bead. Over treatment can be counterproductive if it causes some liquid to spread up the sidewall of the trough 28. It is preferred that the treatment render the surface tension equal or greater than 72 dynes, which is the surface tension of natural water.

The liner 14 is desirably made of molded polystyrene or polypropylene, preferably corona treated to render the surface tension equal or greater than 72 dynes/cm. As mentioned, polypropylene is not a stiff as polystyrene but the polypropylene provides more chemical resistance which may be needed in certain applications.

The width of the channels 84, 86, 90 is desirably about 0.50 mm+/−0.10 mm, except the channel must include a draft angle for molding purposes. Since the bottom of trough 28 is rounded, this means that the channels near the sidewall are wider than those along the centerline.

FIG. 11 shows an exemplary pipette tip 16 engaging the exposed surface of the liner trough 28 with anti-vacuum channels 80 below the tip orifice. With the anti-vacuum channels and the fluid accessible voids underneath the pipette tip orifices, aspiration can occur without causing a vacuum in the pipette tip even if the tip engages the surface of the liner trough. Further, with the hydrophilic surface and connected channels in the trough, even fluid distribution along the trough is facilitated at low liquid levels, which results in a lower minimum working volume for reliable pipetting with a multi-channel pipette.

Figure 12:
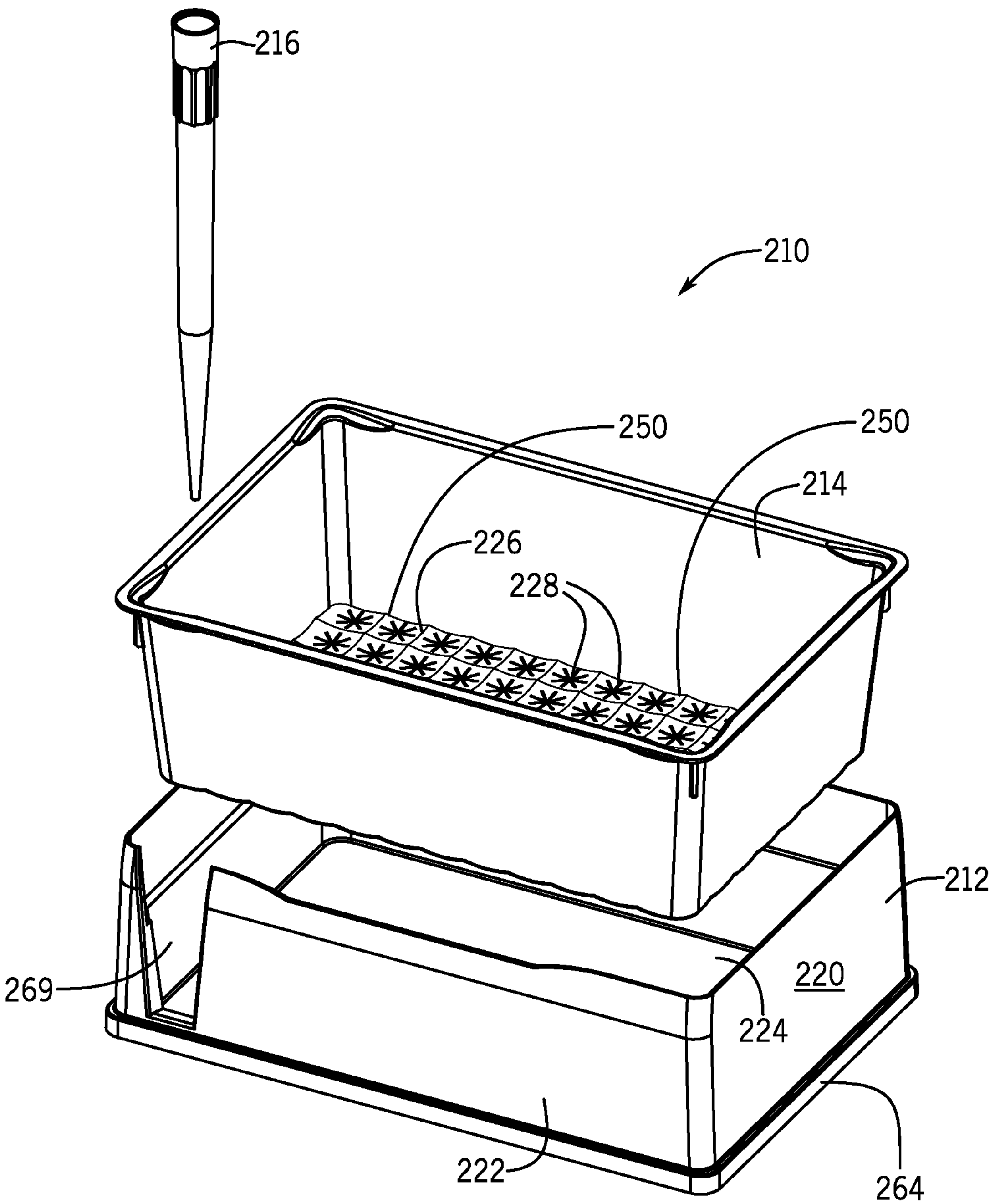
FIG. 12 is a view of a laboratory reservoir kit constructed in accordance with another exemplary embodiment of the invention, which is configured to be used with a 96 pipetting head.
Figure 13:
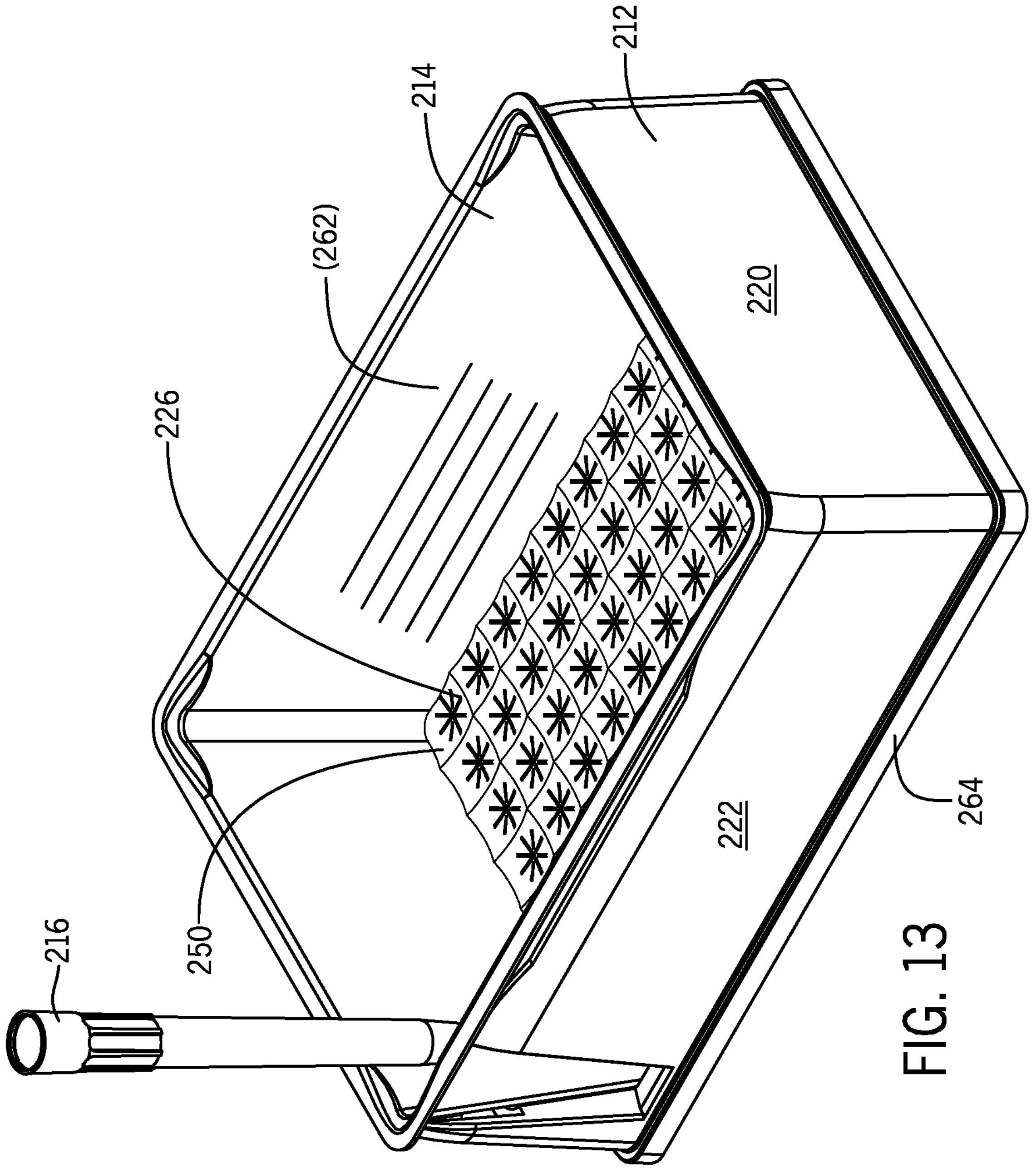
FIG. 13 is an assembled view of the laboratory reservoir kit shown in FIG. 12.

Referring now to FIGS. 12 through 19, a laboratory reagent kit 210 constructed in accordance with the second embodiment of the invention is illustrated. Referring to FIG. 12, the kit 210 includes a reservoir base 212 and a disposable liner 214. FIGS. 12 through 19 also show an exemplary pipette tip 216. The kit 210 is designed to hold liquid sample or liquid reagent in the disposable liner 214 when the disposable liner 214 is placed within the reusable reservoir base 212 as shown for example in FIG. 13. The disposable liner 214 is configured for a 96 pipetting head, has an array of 8 by 12 groupings 226 of anti-vacuum channels, and sized to hold up to 300 ml. Each grouping 228 of channels is located in a recess 250 on the bottom wall 226 of the liner 214. The basin in the reservoir base 212 supports the disposable liner 214. Outer side walls 222 and end walls 220 on the reusable base 212 provide support for the reservoir base 212 on flat surfaces such as a laboratory bench top. While the reservoir base 212 can be made of a variety of materials, it is preferred that the base 212 be made of relatively rigid injection molded plastic having an opaque color such as white ABS. It is preferred that the surface of the inner basin of the base 212 have a satin finish. On the other hand, it is preferred that the disposable liner 214 be made of clear transparent plastic and have a polished surface, such as clear injection molded polystyrene or polypropylene having a thickness of approximately 0.51 mm. The polished or shiny surface of the clear liner, in contrast to the satin finish on the opaque inner basin of the base 212, renders the transparent liner 214 more conspicuous to laboratory workers trying to determine whether or not it is present within the reservoir base 212. Injection molding is the preferred method to manufacture the disposable liner 214 because it is desirable for the liner thickness to be constant throughout. It should be recognized, however, that other manufacturing methods and thickness specifications may be possible for both the disposable liner 214 and the reusable base 212. The inner basin of the reusable base 212 is rectangular and extends between the bottoms of the inside surfaces of the end walls 220 and the side walls 222. The bottom wall 224 of the basin in the reusable base 212 is flat. Referring to FIGS. 12 and 13, the disposable liner 214 is configured to fit in the base 212 so that the bottom wall 224, the end walls 220 and the longitudinal side walls 222 of the base 12 support the disposable liner 214 with the bottom wall 226 of the liner 214 sitting on the bottom wall 224 of the reservoir base 212.

The bottom flange 264 on the base 212 has outside wall dimensions compatible with SBS standards (namely ANSI/SLAS 3-2004: Microplates—Bottom Outside Flange Dimensions). Having SBS compatible outside wall dimensions means that the base 212 will fit into platform nests for liquid handling systems having a 96 pipetting head, and be in alignment so that each of the pipette tips aligns at least generally with one of the groupings of anti-vacuum channels 228. Since the liner 214 is made for a 96 pipetting head, the distance between the center points 266 for adjacent groupings of channels 228 in the respective recesses 250 is 9 mm.

Reference number (262) depicts volume liquid graduation marks which as in the previous embodiment are printed on the side wall of the base 212 so that they can be viewed through the liner 214 made from a clear transparent material such as molded polystyrene or polypropylene. The disposable liner 214 in this embodiment, as mentioned, has a bottom wall 226 patterned with recesses 250. A window 269 is provided in the front side wall 222 of the base 212 to facilitate viewing of liquid in the liner 214. Additional windows can be provided if desired. FIG. 13 shows the disposable liner 214 set into the reusable base 212.

Figure 15:
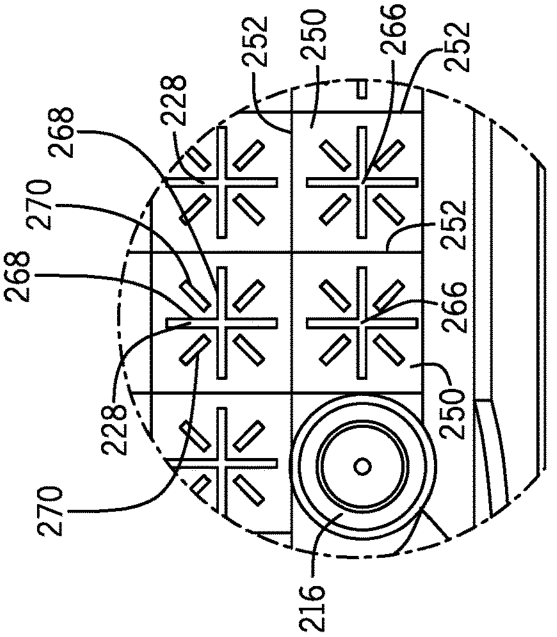
FIG. 15 is a detailed view of the region depicted by line 15-15 in FIG. 14.
Figure 14:
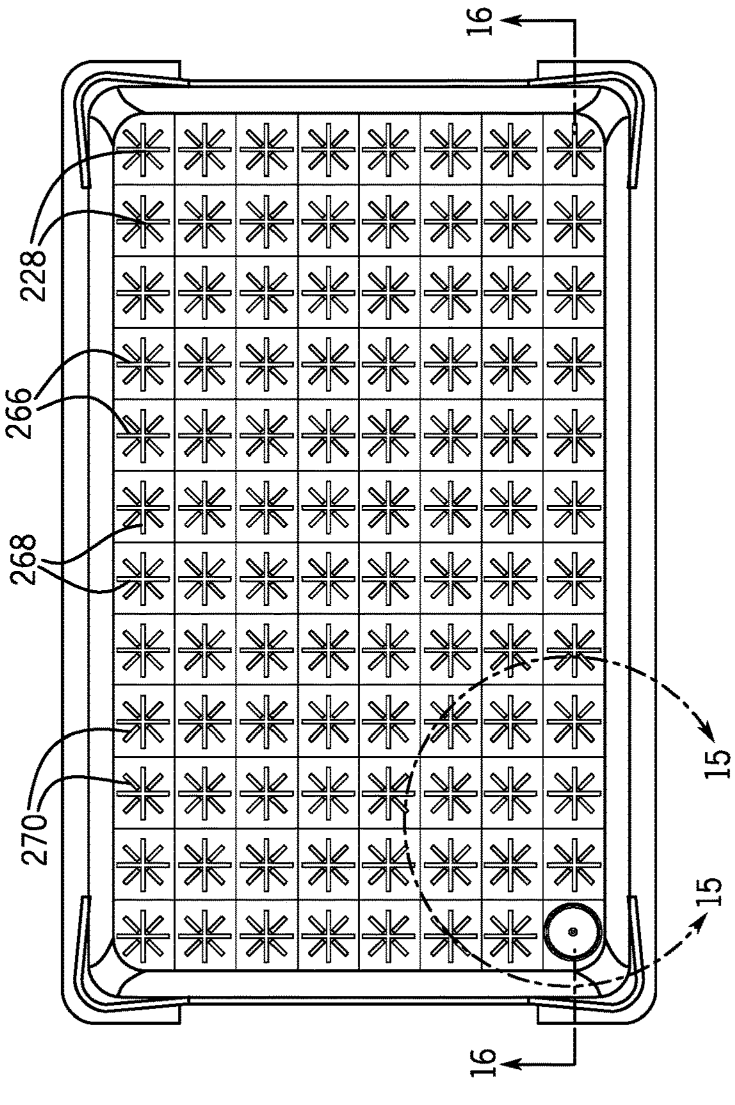
FIG. 14 is a top plan view of the laboratory reservoir kit shown in FIGS. 12 and 13.

Referring to FIGS. 14 and 15, the groupings of anti-vacuum channels 228 on the bottom wall 226 of the liner 214 have a first pair of perpendicularly intersecting channels 268 and a second pair of perpendicular channels 270 which are rotated 45 degrees from the first pair. The second pair of perpendicular channels 270 are interrupted in the vicinity of at the center point 266 of the intersection of the first pair of channels 268, which creates an irregularly shaped pedestals at the height of the upper surface of the bottom wall 226 between the channels. Allowing the second pair of channels 270 to continue through the center point 266 would create an air space around the center point 266 having too great of a diameter to obstruct continued downward movement of the lower distal end of the smallest sized pipette tip that the disposable liner 214 is designed to be used with. For the 96 pipetting head, the channels 268, 270 in FIGS. 14 and 15 may optimally be a width of 0.50 mm±0.1 mm and a depth of 0.30 mm±0.1 mm, for example. The configuration of the channel groupings 228 in FIG. 15 is an alternative configuration to that shown in the first embodiment.

Figure 16:
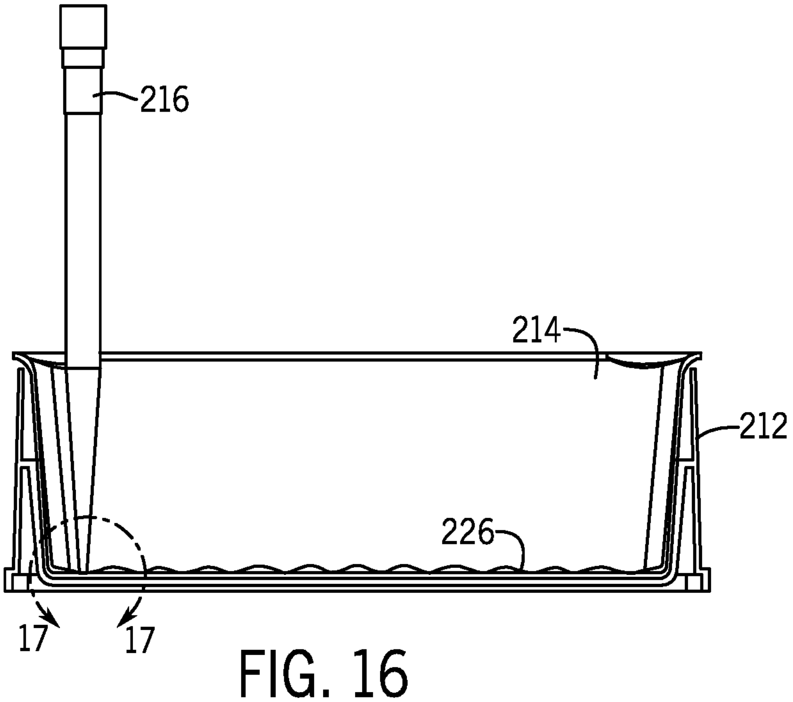
FIG. 16 is a sectional view taken along line 16-16 in FIG. 14.
Figure 17:
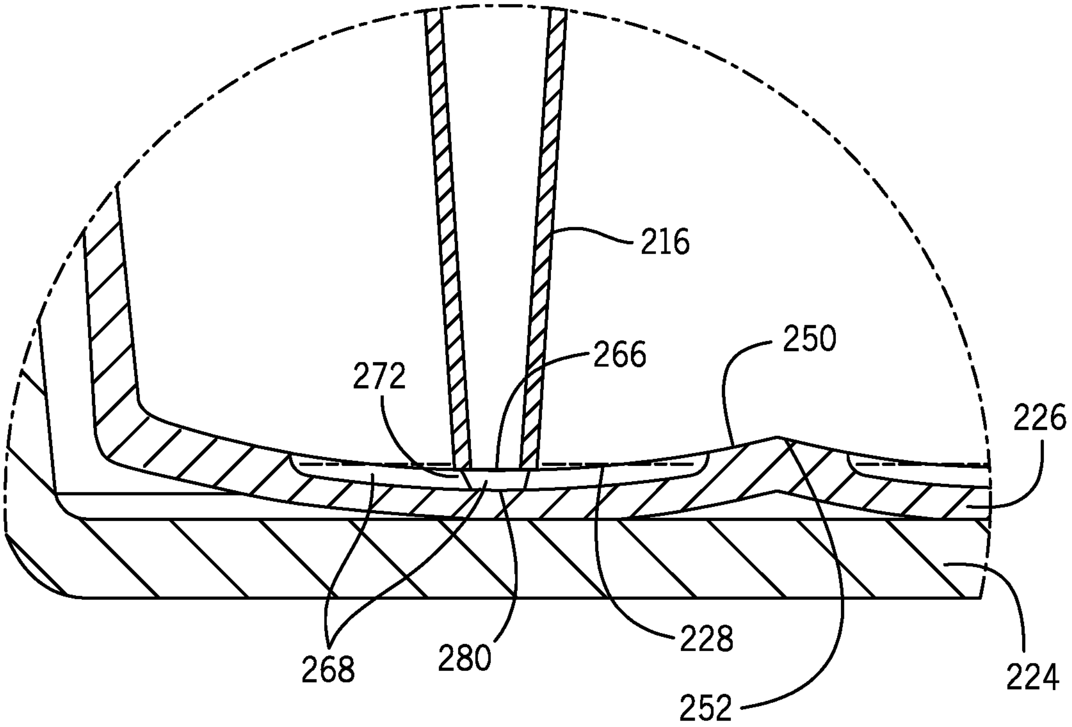
FIG. 17 is the detailed view of the region depicted by the 17-17 in FIG. 16.
Figure 18:
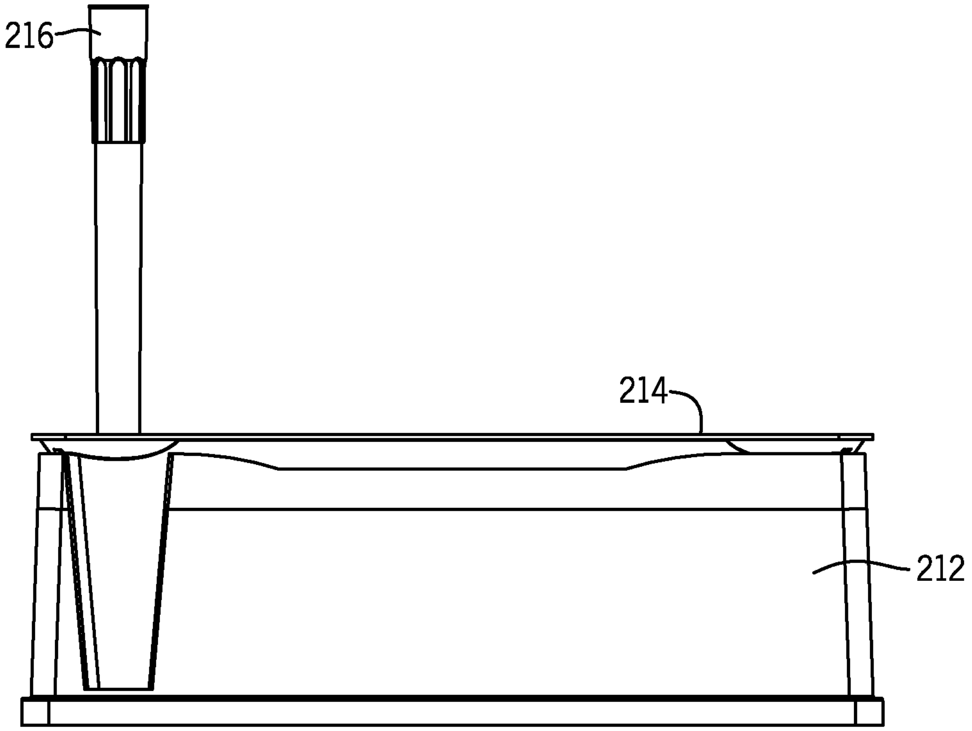
FIG. 18 is a side elevational view of the laboratory reservoir kit shown in FIGS. 12 through 17.
Figure 19:
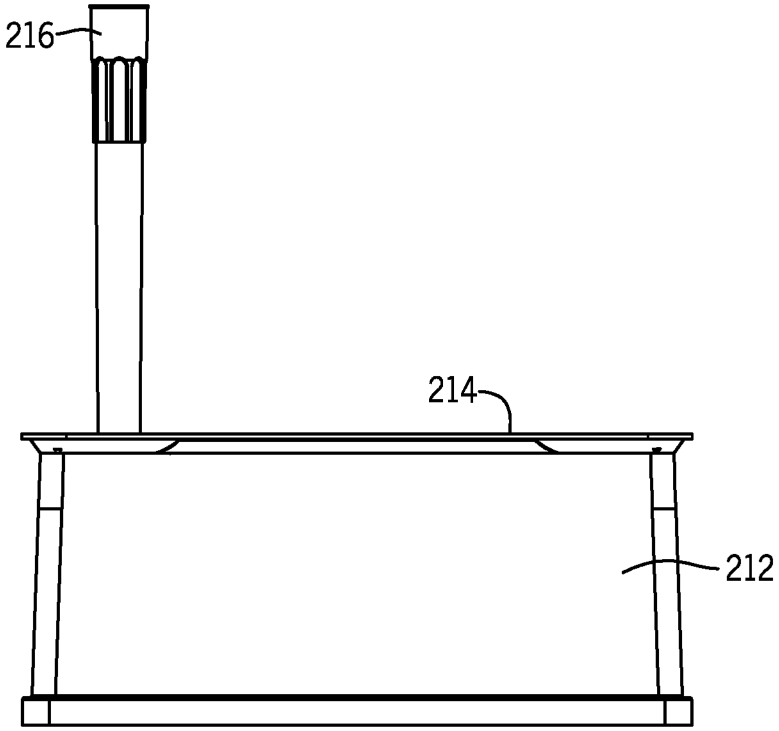
FIG. 19 is a side view of the laboratory reservoir kit depicted in FIGS. 12 through 17.

Referring now to FIGS. 16 and 17, the bottom wall 226 of the liner 214 is patterned with recesses 250 in order to reduce residual liquid waste. Referring in particularly to FIG. 17, each grouping of channels 228 is located within a recess 250 which preferably has the curvature of a partial sphere. Each recess 250 is separated from adjacent recesses by a linear ridge 252 as shown in FIG. 17 (and also shown from above in FIG. 15). Since the liner 214 is made for a 96 pipetting head, the distance between the center points 266 for adjacent groupings of channels 228 in the respective recesses 250 is 9 mm. The low points 280 of the respective recesses 250 are located at the center point 266 of the respective recess 250 and at the center point 266 for the respective channel grouping 228. The low point 280 for all recesses in the liner 214 should reside in a common plane so that the bottom wall 226, while patterned or dimpled, sits generally level on the straight bottom wall 224 of the base 212. The bottom of the pipette tip 216 is shown pressing against the pedestals 272 so that part of the channels 268, 270 are located at least partially below the tip orifice. In this way, no vacuum is created when the pipette is operated to aspirate liquid into the pipette tip 216.

FIGS. 20 through 24 show a disposable reservoir liner 514 constructed in accordance with another embodiment of the invention. Referring now to FIGS. 20 through 24, the liner 514 contains groupings 528 of anti-vacuum channels designed to accommodate both a 96 pipetting head and a 384 pipetting head. In this embodiment, some of the anti-vacuum channels are shared between groupings 522 for the 96 pipetting head and the groupings 520 for the 384 pipetting head, see FIGS. 23 and 24. The anti-vacuum channels 528 extend beyond the area in which they are expected to be used for pipette tips on a 96 head and are part of the groupings 520 of anti-vacuum channels used for a 384 head. The 384 head groupings 520 as depicted is FIG. 23 include horizontal and vertical channels and diagonal channels in addition to a circular channel. The bottom wall 510 of the liner 514 in this embodiment is flat except for the channels 528 on the upper surface of the bottom wall 510. The distance between adjacent center points for 384 head channels groupings is 4.5 mm. The distance between center points for adjacent 96 head groupings is 9 mm. Desirably, the width of the channels is 0.5 mm+/−0.1 mm. Groupings of anti-vacuum channels with alternative configurations can be substituted depending on the intended use of the liner 514. In addition, the channel grouping configuration shown in FIGS. 23 and 24 can be used in other embodiments, such as that shown in FIGS. 12 through 19.

Figure 20:
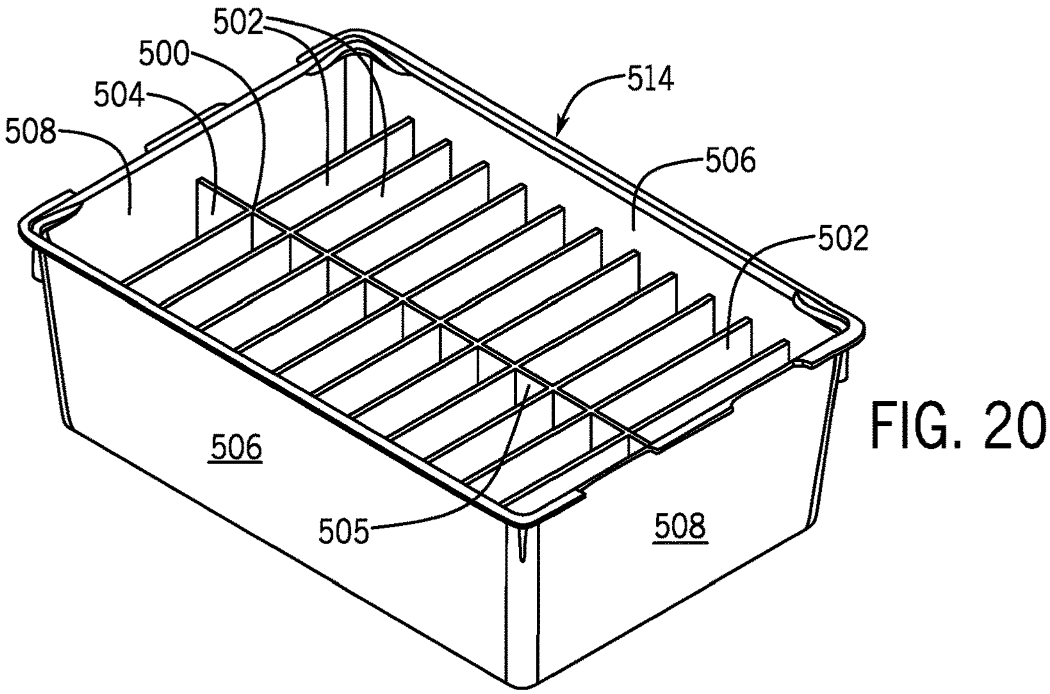
FIG. 20 is a perspective view of another liner constructed in accordance with the invention, which includes a removable baffle or splash guard.
Figure 21:
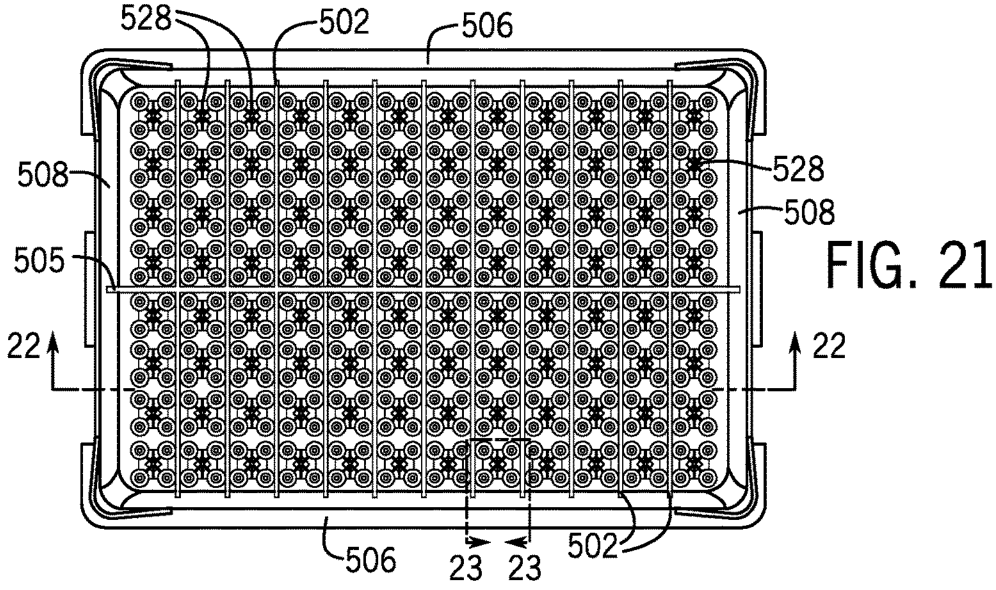
FIG. 21 is a top plan view of the liner illustrated in FIG. 20.
Figure 22:
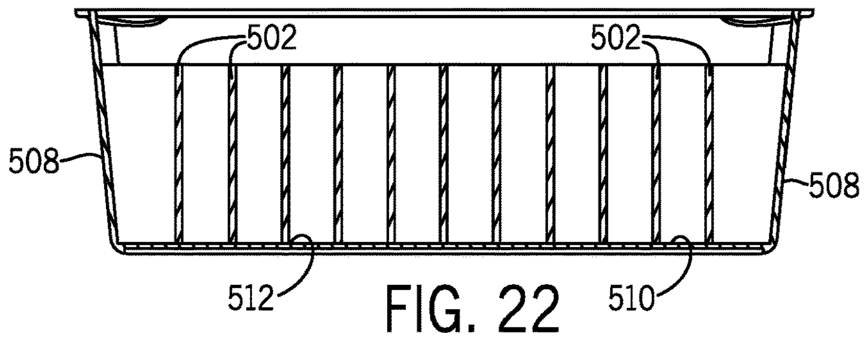
FIG. 22 is a sectional view taken along line 22-22 in FIG. 21.

A removable baffle 504, or splashguard, is set within the basin of the liner 514. The splashguard 504 shown in FIGS. 20 through 22 includes a plurality of upstanding walls 502 and 505. Upstanding walls 502 are located between adjacent rows of the groupings 528 of anti-vacuum channels. In the embodiment shown in FIGS. 20 through 22, there are eleven (11) walls 502 between the rows of groupings 528 of anti-vacuum channels. There is one upstanding wall 505 that is perpendicular to the upstanding walls 502 located between the rows of groupings 528 of anti-vacuum channels. The upstanding walls 502 and 505 are molded together as a single component that is removable from the liner 514. As shown in FIG. 22, the upstanding walls 502 extend from the bottom wall 510 upward vertically, but there is no seal at the bottom of the upstanding walls 502 which is depicted by reference number 512. As mentioned, the bottom wall 510 is flat, not patterned as shown in FIGS. 12 through 19. The upstanding walls 502 extend between sidewalls 506 and 508 of the liner 514, but similarly do not form a seal at the point of engagement with the sidewalls 506, 508. The upstanding wall 505 extends between end walls 508, and likewise does not form a seal at the end walls 508. The splashguard 504 can contain more upstanding walls 505 extending between the end walls 508, and can also include less upstanding walls 502 extending between the sidewalls 506, than is shown in FIGS. 20 through 22. In accordance with the invention, however, it is desirable that the walls 502, 505 be located between adjacent rows or columns of groupings 528 of anti-vacuum channels.

Figure 23:
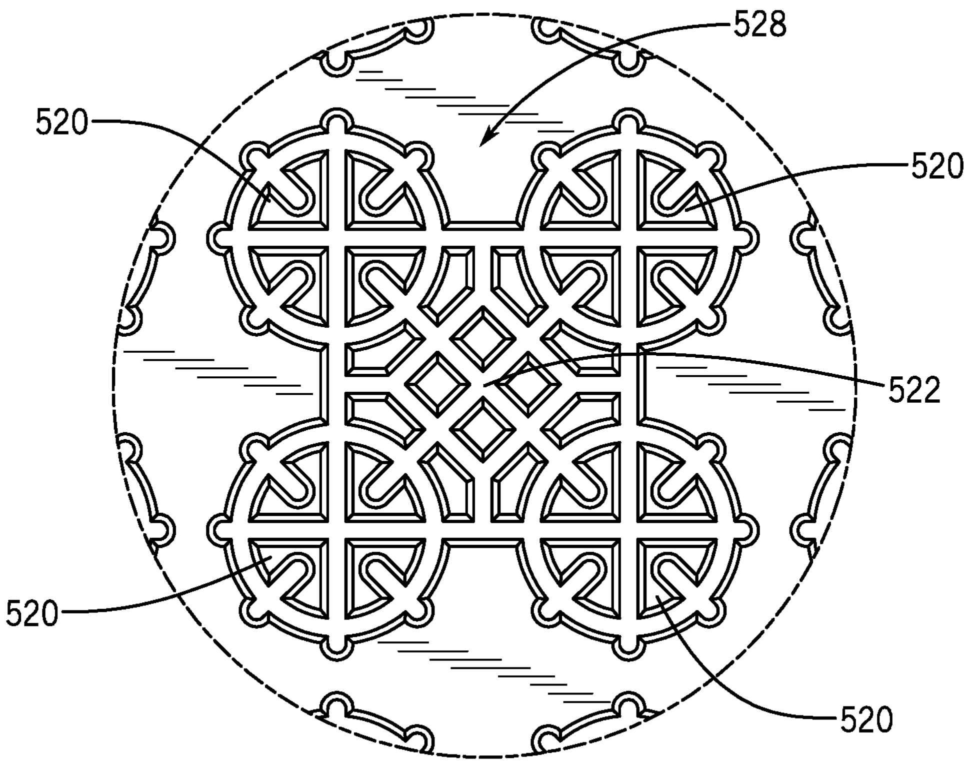
FIG. 23 is a detailed view of the channel grouping shown in region of the liner encircled by the line 23-23 in FIG. 21.
Figure 24:
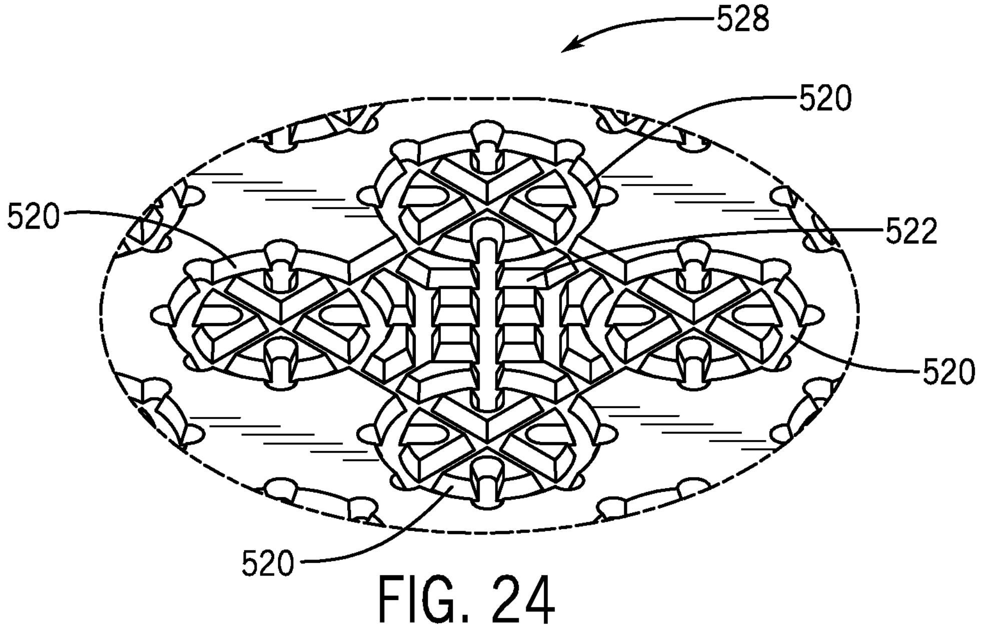
FIG. 24 is a perspective view of the channel grouping illustrated in FIG. 23.
Figure 25:
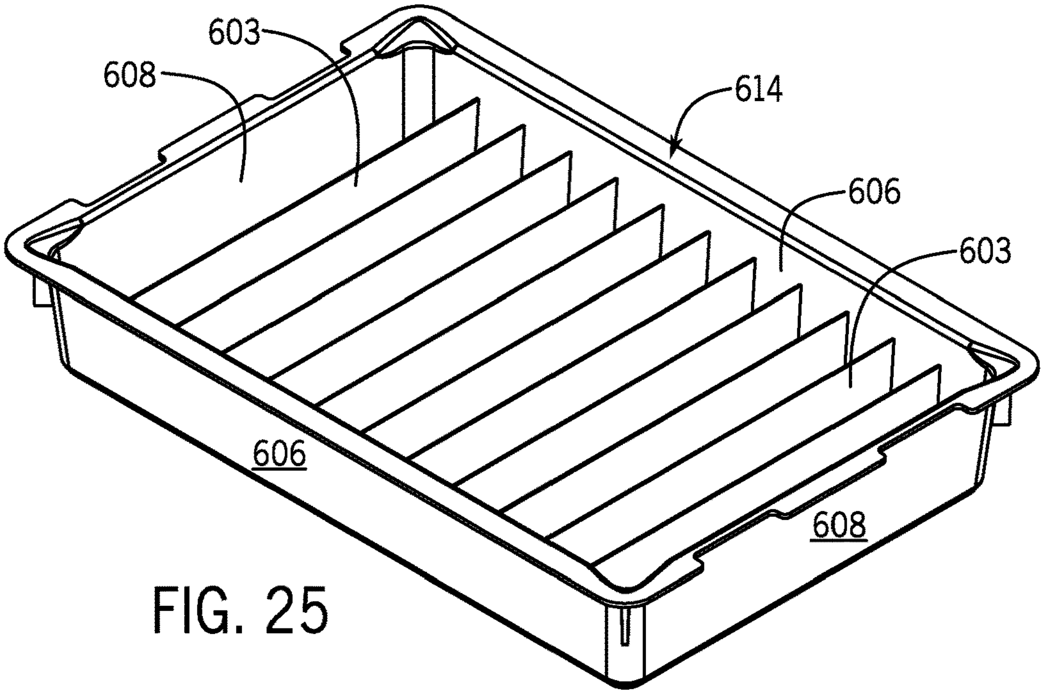
FIG. 25 is a perspective view of another liner constructed in accordance with the invention, which includes sealed barrier walls between rows of anti-vacuum channels.
Figure 26:
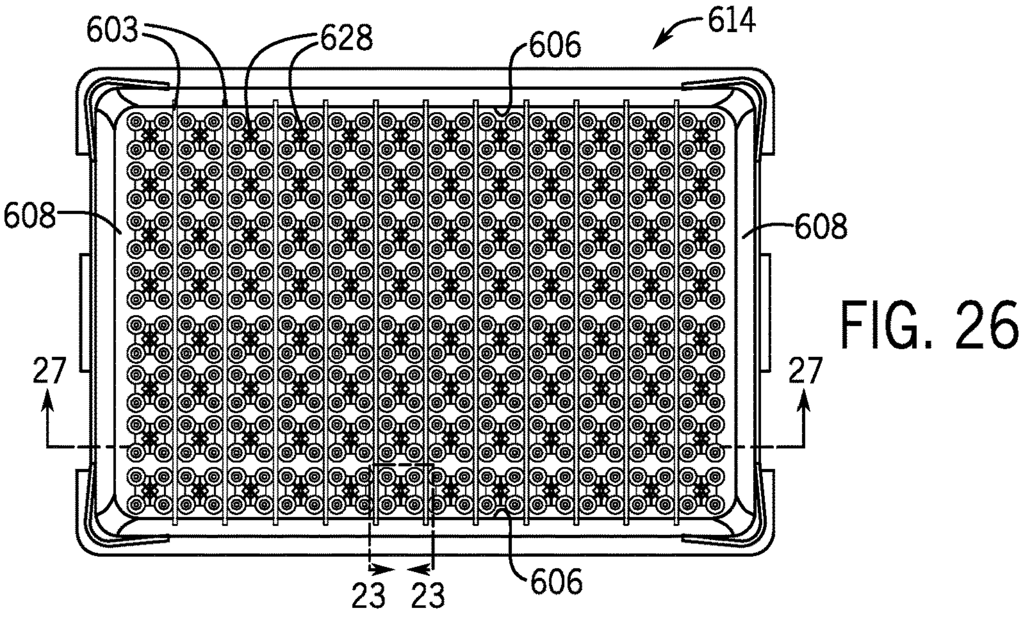
FIG. 26 is a top plan view of the liner illustrated in FIG. 25.
Figure 27:
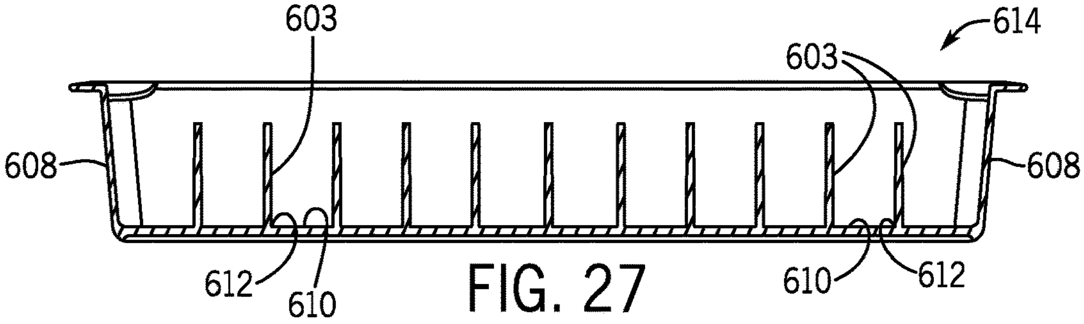
FIG. 27 is a sectional view taken along line 27-27 in FIG. 26.

FIGS. 25 through 27 show another embodiment of the invention in which a disposable liner 614 includes upstanding walls 603 as an integral component, such that the reservoir liner 614 in effect contains multiple separate basins. Referring to FIG. 27, the upstanding walls 603 are integrally molded with the flat bottom wall 610 of the liner so that the bottom 612 of the respective wall 603 is completely sealed with the bottom wall 610. In this example, there are eleven (11) upstanding walls 603 extending between sidewalls 606. The intersection between the upstanding walls 603 and the sidewalls 606 is also integrally molded to form a seal. The disposable liner 614 therefore contains twelve (12) separate basins. The floor of each basin 610 desirable includes a row of groupings 628 of anti-vacuum channels. Each grouping 628 has the small configuration as shown in FIG. 23 and described above. The walls 603 are placed between adjacent rows of groupings 628. A disposable liner can be made to include less than eleven (11) walls, and can also include one or more walls extending between end walls 608, i.e. in a direction perpendicular to the walls 603 shown in FIGS. 22 through 24. In all cases, it is important that the walls do not interfere with the location of an array of pipette tips on a 96 and/or 384 pipetting head. The groupings 628 of anti-vacuum channels in the liner 614 shown in FIGS. 25 through 25 are designed to accommodate both 96 pipetting heads and 384 pipetting heads. Groupings of anti-vacuum channels with alternative configurations can be substituted depending on the intended use of the liner 614.

The liners in the embodiments shown in FIGS. 20 through 27 are preferably made of polystyrene or polypropylene and corona treated or otherwise treated in order to make the bottom wall with anti-vacuum channels more hydrophilic; e.g. a surface tension of greater then or equal to 72 dynes/cm which is the surface tension of natural water. In addition, it may be desirable to connect the groupings of channels with intervening channels. As mentioned above, it is believed that the hydrophilic nature of the corona treated surface causes liquid on the surface to self level, while the channels provide surface tension features that accumulate liquid on the surface. The result is that the liquid draws naturally from the surface between the groupings of channels and forms segregated pools in and above the groupings of channels as the liquid level is drawn down. This phenomenon, as mentioned, effectively lowers the minimum working volume for reliable pipetting.

Figure 28:
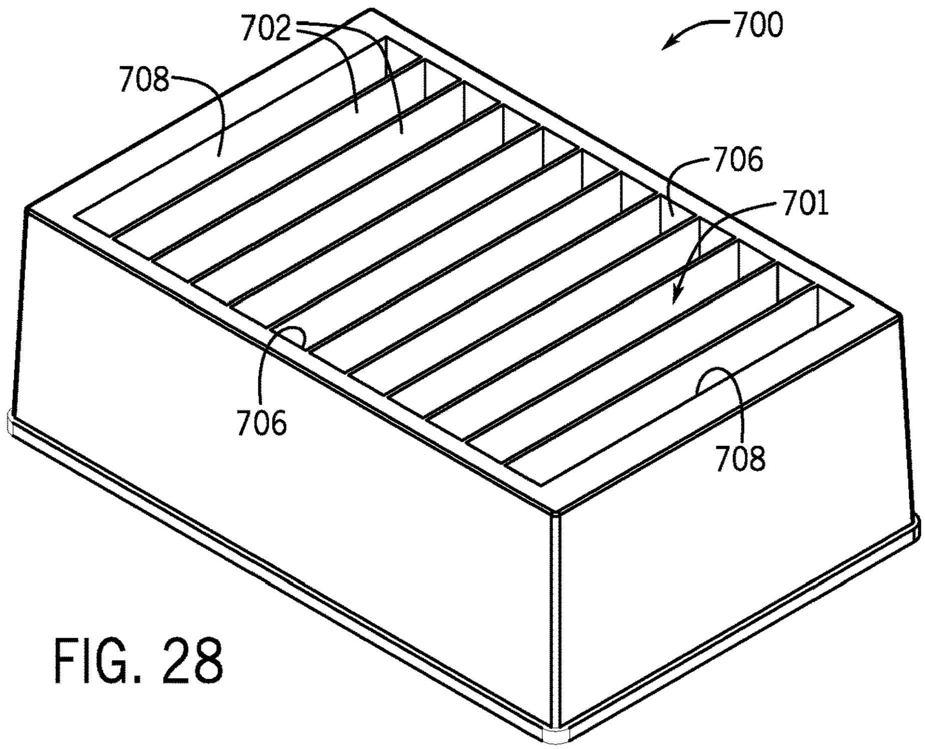
FIG. 28 is a perspective view of a sample or reagent reservoir constructed in accordance with the invention, which includes sealed barrier walls between rows of anti-vacuum channels.
Figure 29:
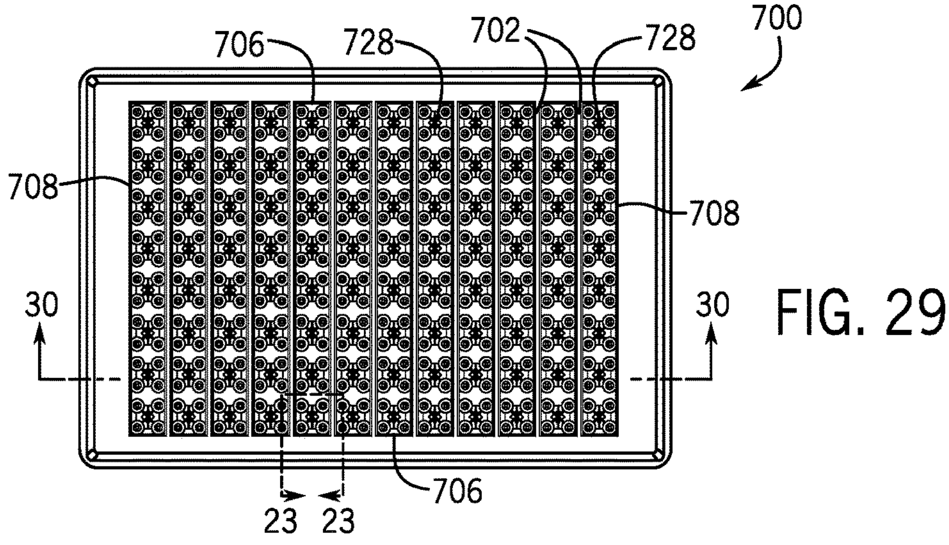
FIG. 29 is a top plan view of the reservoir illustrated in FIG. 28.
Figure 30:
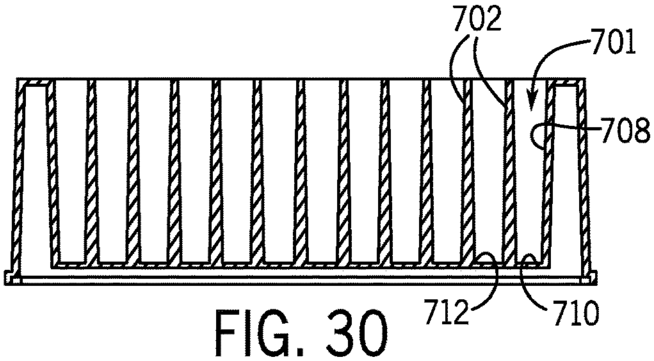
FIG. 30 is a sectional view taken along line 30-30 in FIG. 28.

FIG. 28 through 30 are directed to another embodiment of the invention in which a laboratory reservoir 700, without a disposable lining, includes anti-vacuum channels 728 exposed upwardly towards the volume in which liquid sample or liquid reagent is held. The reservoir 700 in FIGS. 28 through 30 includes a basin 701 with optional walls 702 extending between sidewalls 706 of the basin 701. The upstanding walls 702 are sealed at the bottom 712 along the bottom wall 710 of the reservoir and are also sealed at the points where the upstanding walls 702 intersect with the respective sidewalls 706. There are eleven (11) upstanding walls 702 separating the reservoir basin 701 into twelve (12) separated volumes. These upstanding walls 702 are optional and the other described aspects of the invention can be implemented whether the upstanding walls 702 are present or not. In addition, the reservoir 700 can be designed with one or more upstanding walls extending between end walls 708. Referring in particular to FIG. 29, the reservoir 700 includes groupings 728 of anti-vacuum channels which are located in an array of rows and columns appropriate for both SBS formatted 96 pipetting heads and 384 pipetting heads.

In the version of the reservoir 700 shown in FIGS. 28 through 30, the bottom wall 710 is flat, except for the anti-vacuum channels. As an alternative to groupings of anti-vacuum channels 728 as depicted in FIGS. 29 and 23, the entire upwardly facing surface of the bottom wall 710 can include anti-vacuum channels. Desirably, however, separated groups 728 of anti-vacuum channels are molded into the bottom wall 710, or the groupings can be connected with intervening channels. The configuration of the groupings 728 is desirably the same or similar to that described above with respect to the reservoir liners and particularly shown in FIGS. 23 and 24. The reservoir 700 is preferably made of polystyrene or polypropylene, and corona treated or otherwise treated in order make the bottom wall 710 with the anti-vacuum channels more hydrophilic than before treatment; e.g. a surface tension of greater than or equal to the surface tension of natural water, 72 dynes/cm, for the same reasons as discussed above with respect to the other embodiments.

Whether or not a reservoir constructed in accordance with the invention includes the optional upstanding walls 702, it may be desirable to pattern the bottom wall 710 with round recesses in order to reduce liquid hang-up, as described above in FIGS. 12 through 19 but with respect to the bottom wall of a liner. For a reservoir having a patterned bottom wall designed to be used with a 96 pipetting head, the bottom wall 710 of the reservoir 700 would include an array of 8 by 12 groupings of anti-vacuum channels each having a center point with 9 mm spacing. The anti-vacuum channels would not include groupings for 384 tips at a 4.5 mm spacing. Each grouping of channels is located within a recess, and to the extent that adjacent groupings are not separated by a wall, the recesses are separated by linear ridge similar to that described above with respect to FIGS. 12 through 19. The low points of the respective recesses are desirably located at the center point of the groupings of anti-vacuum channels, and also reside in a common plane, so that the bottom wall, while patterned or dimpled, sits generally level. For a reservoir having a patterned or dimpled bottom wall and designed for use with a 384 pipetting head, groupings of anti-vacuum channels are spaced at 4.5 mm and are located in recesses spaced at 4.5 mm apart.

Figure 31:
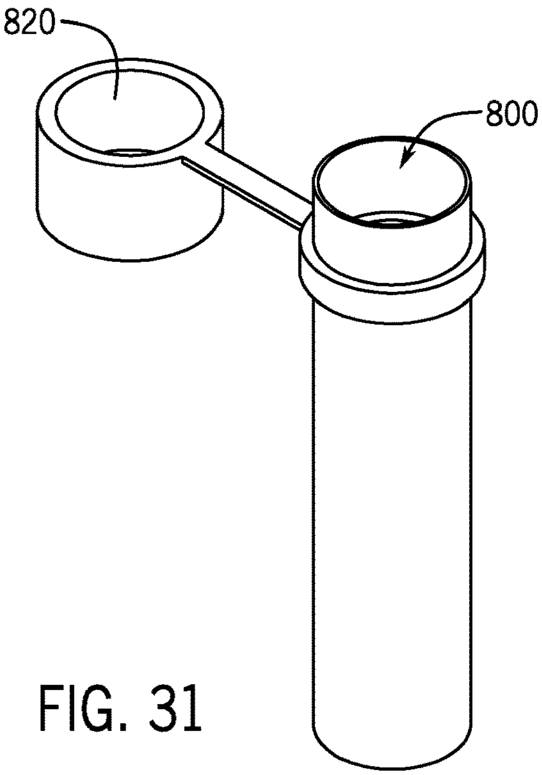
FIG. 31 is a perspective view of a microtube constructed in accordance with the invention.
Figure 33:
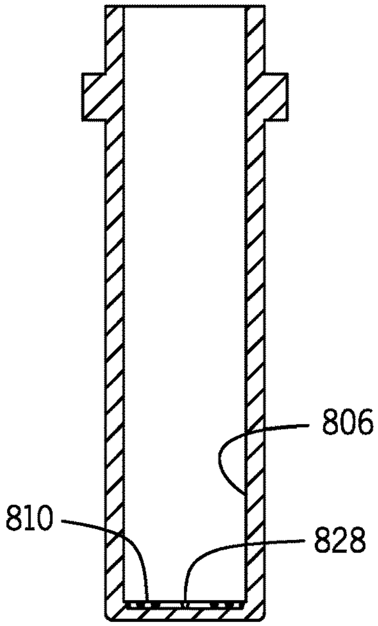
FIG. 33 is a sectional view taken along line 33-33 in FIG. 32.
Figure 32:
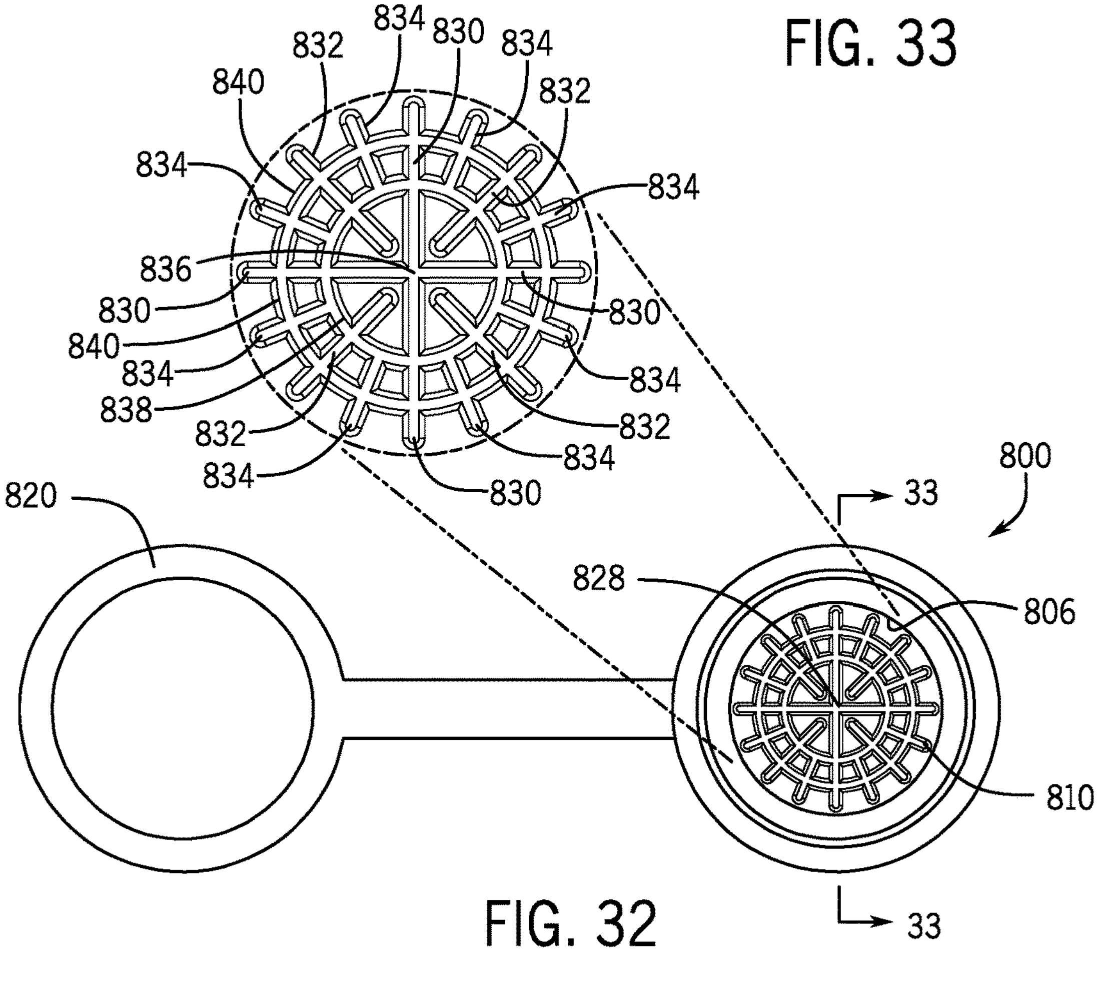
FIG. 32 is a top plan view of the microtube illustrated in FIG. 31.
Figure 34:
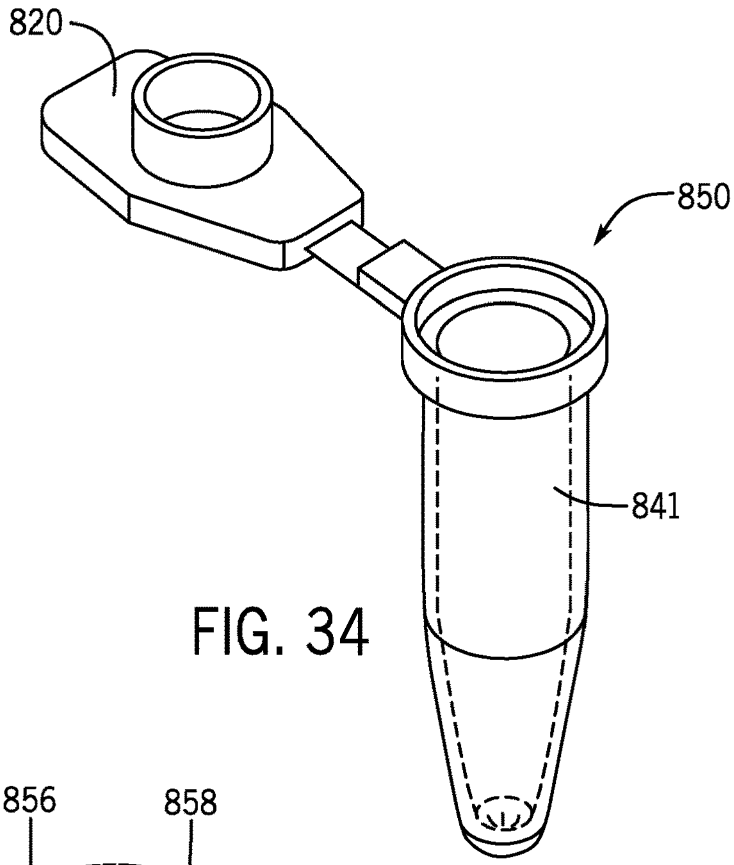
FIG. 34 is a perspective view of a PCR tube constructed in accordance with the invention.
Figure 35:
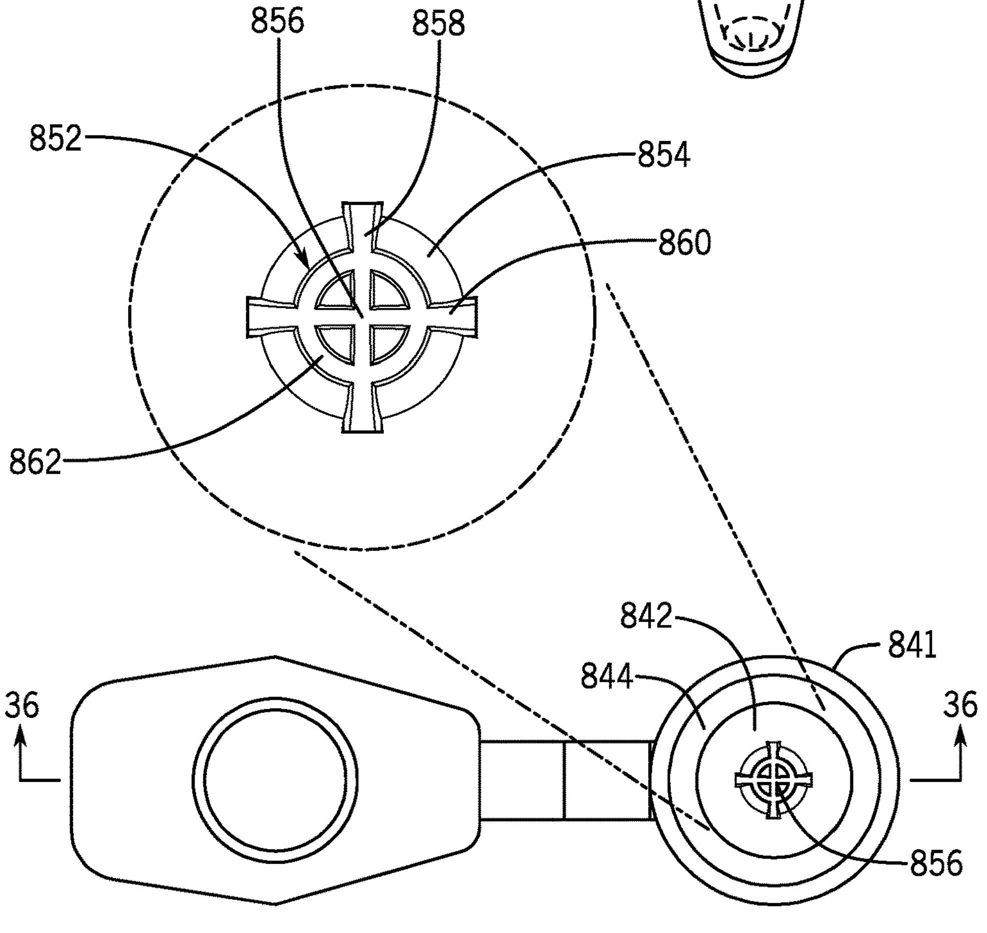
FIG. 35 is a top plan view of the PCR tube illustrated in FIG. 34.
Figure 37:
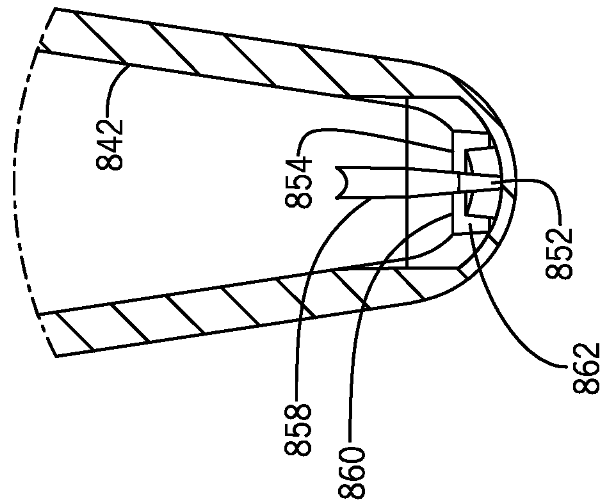
FIG. 37 is a detailed view of the region identified by line 37-37 in FIG. 36.
Figure 36:
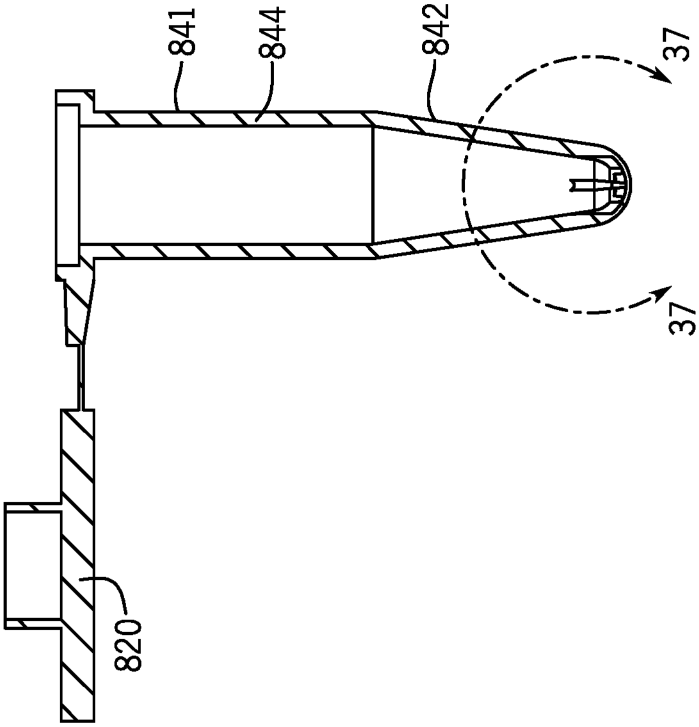
FIG. 36 is a sectional view taken along line 36-36 in FIG. 35.

FIGS. 31 through 32 illustrate a laboratory microtube 800 having anti-vacuum channels 828 on the bottom wall 810 of the microtube in accordance with another aspect of the invention. The microtube 800 includes a receptacle 806 for holding liquid reagents or samples. The receptacle 806 has cylindrical sidewalls and a bottom wall 810 which is normally flat, or at least a portion of it is flat, except for the channels 828. Although not shown in FIGS. 31 through 33, a beveled portion exists in some microtubes and extends between the cylindrical sidewall 806 and the flat portion 810 of the bottom wall. The anti-vacuum channels 828 are located on the flat portion of the bottom wall 810. The microtube 800 also includes a cap 820 for closing the microtube. The cap 820 is shown attached to the microtube 800 but need not be attached. The microtube 800 can be molded from various materials but polypropylene is preferred. It is desirable to corona treat or otherwise treat the microtube so that the bottom wall 810 has increased wettability compared to the bottom wall prior to corona treating. In FIGS. 32 and 33, it is desired that the channels have a width of 0.50 mm±0.1 mm and have a depth of 0.30±0.1 mm. The pattern of anti-vacuum channels shown on FIG. 32 includes a first pair of perpendicular intersecting channels 830 with the intersection defining a center point 836 and a second pair of perpendicular channels 832 rotated 45° from the first pair 830. The second pair 832 of channels are aligned to intersect at the center point 836 but are interrupted in the vicinity of the center point 836. In addition, an inner circular channel 838 and an outer circular channel 840 are provided both intersecting with each of the channels of the first 830 and second 832 pairs. Additional channels 834 extend from the inner circular channel 838 through the outer circular channel 840 and beyond towards the cylindrical wall 806. The channel configuration covers essentially the entire bottom wall, which not only provides the anti-vacuum feature over the entire area of the bottom wall to facilitate reliable use with a hand-held pipette without the risk of vacuum engagement but also helps to draw liquid towards the pipette tip orifice when aspirating the final amount of liquid from the tube because of the capillary action of the channels. Other rib or channel configurations may be suitable for implementing the invention in a microtube as well.

While the bottom wall 810 is flat in the embodiment of the microtube 800 shown in FIGS. 31 through 33, it is also possible for the microtube to have a curved bottom. In this case, it is desired that the curved bottom be spherical with the low point of the sphere aligning with the center point of the anti-vacuum channels or ribs.

FIGS. 34 through 37 show a PCR tube 850 having a group of anti-vacuum channels 856 on a bottom wall 854. The PCR tube 850 includes a tube body 840 and a cap 820, which are made of polypropylene as is typical in the art. As with the other embodiments, it is desirable to corona treat or otherwise treat the tube so the surface tension is greater then or equal to the surface tension of natural water of 72 dynes/cm. The tube body 841 has an upper cylindrical wall 844 and a lower tapered wall 842. The bottom wall 854 located at the bottom of the tapered wall 842 and is flat in FIGS. 34 through 37 except for the anti-vacuum channels 852, although in some PCR tubes the bottom wall may be curved. The grouping 852 of anti-vacuum channels includes perpendicular channels 858, 860 which insect at a center point 856. A circular channel 862 intersects the perpendicular channels 858, 860. The perpendicular channels 858, 860 extend beyond the flat portion 854 of the bottom wall and slightly up a transition to the lower tapered wall 842. The channels in this embodiment have a width 0.5 mm+/−0.1 mm when located on the flat portion of the bottom wall. Channel width is not as important along the sidewall because the pipette tip cannot bottom out on the sidewall. Nevertheless, the channels must have an appropriate draft angle to facilitate reliable molding during production. It is contemplated that a similar channels configuration can be implemented in a PCR strip or PCR plate having several receptacles each individually similar to the channel configuration of the PCR tube shown in FIGS. 34 through 37.

FIGS. 38 through 46 show the use of the anti-vacuum channels in microplates. FIGS. 38 through 41 show a 96 well microplate 900 having anti-vacuum channels 928 on the bottom wall 910 in each well 902. FIGS. 42 through 46 show a 384 microplate 1000 having anti-vacuum ribs 1028 on the bottom wall 1010 of each well 1002. Both the 96 well microplate 900 and the 384 well microplate 1000 have sidewalls 904, 1004 and end walls 906, 1006, as well as a bottom, outer wall flange 908, 1008, dimensioned to fit in nests configured to hold SBS-formatted microplates. The 96 well microplate 900 includes 96 separate wells arranged in 8 columns and 12 rows with each well 902 being configured to hold a volume of liquid sample or reagent. The center point for each of the wells is spaced 9 mm from the center point of adjacent wells, and the center point for the anti-vacuum channels 928 in the respective wells 902 is also centered at the center point of the wells 902. For the 96 well microplate 900, the anti-vacuum channels desirably have a width of 0.5 mm+/−0.1 mm and have a depth of 0.3 mm+/−0.1 mm. Each well includes one grouping of anti-vacuum channels. The grouping 928 desirably includes a first pair of perpendicularly intersecting channels 922, and a second pair perpendicularly intersecting channels 924 from the first pair 922. The second pair 924 intersect at a center point, and the first pair are interrupted as they would otherwise pass through the center point. An inside circular channel 926 and an outside circular channel 930 intersect the channels of the first 922 and second 924 pairs of channels. As with other embodiments, the microplates in FIGS. 38 through 46 are desirably made of polystyrene or polypropylene and corona treated or otherwise treated to increase wettability for similar reasons as explained above.

Figure 38:
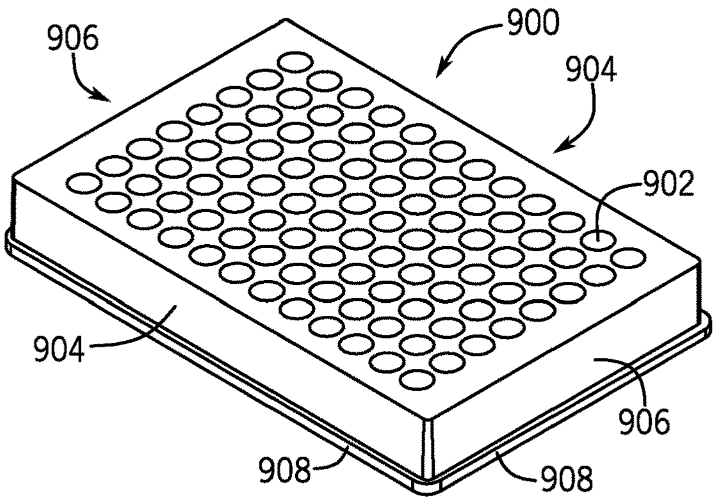
FIG. 38 is a perspective view of a 96-well microplate constructed in accordance with the invention.
Figure 39:
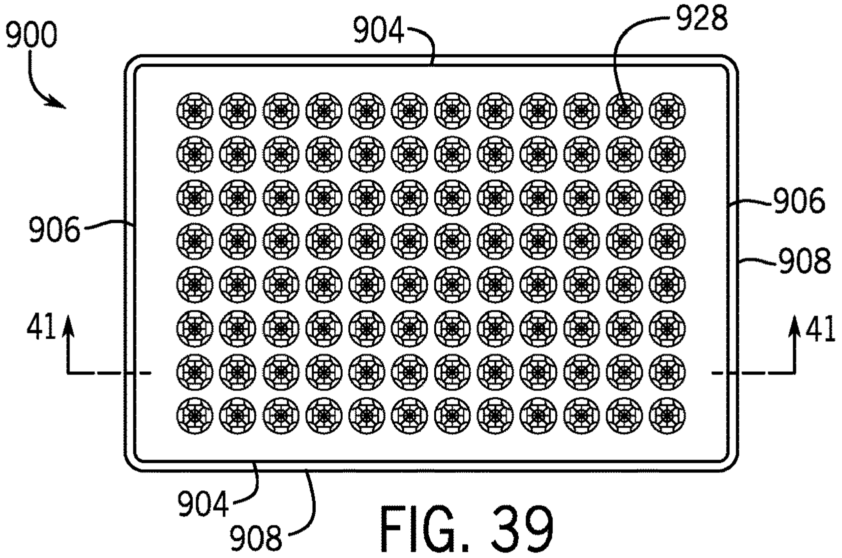
FIG. 39 is a top plan view of the microplate illustrated in FIG. 38.
Figure 40:
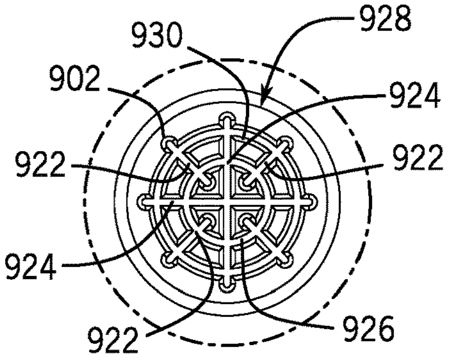
FIG. 40 is a detailed view of a well in the microplate illustrated in FIGS. 38 and 39.
Figure 41:
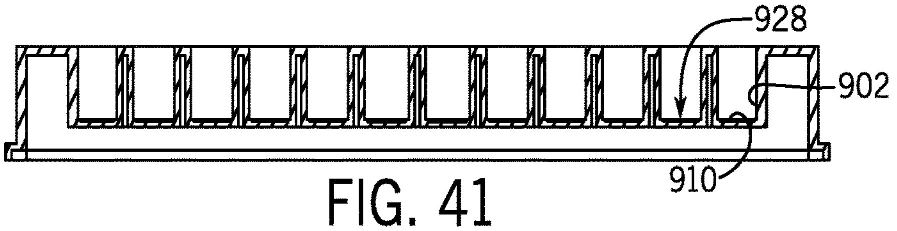
FIG. 41 is a section view taken along line 41-41 in FIG. 39.
Figure 42:
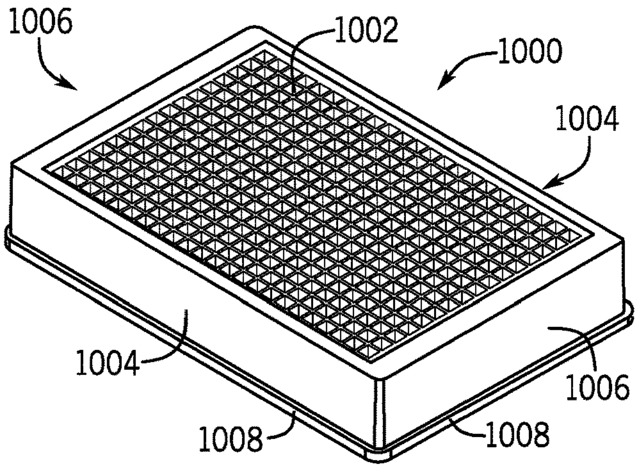
FIG. 42 is a perspective view of a 384-well microplate constructed in accordance with the invention.
Figure 43:
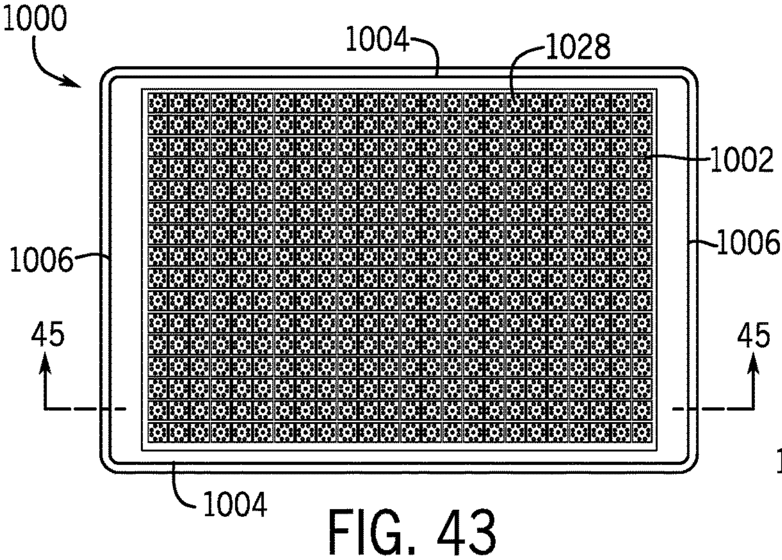
FIG. 43 is a top plan view of the microplate illustrated in FIG. 42.
Figure 44:
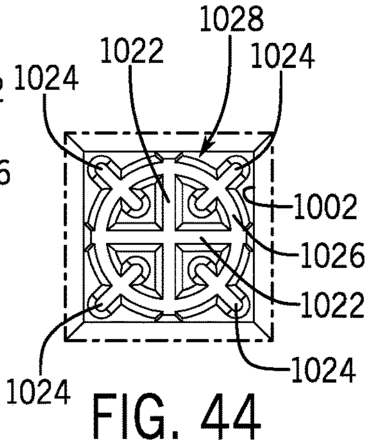
FIG. 44 is a detailed view of a well in the microplate illustrated in FIGS. 42 and 43.
Figure 45:
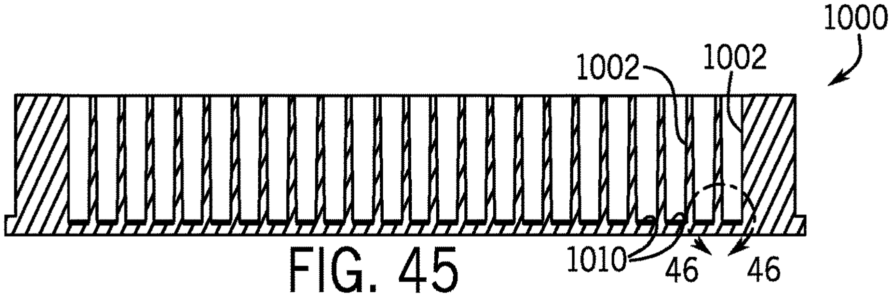
FIG. 45 is a section view taken along line 45-45 in FIG. 43.
Figure 46:
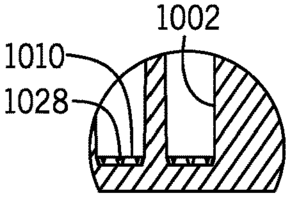
FIG. 46 is a detailed view of the region identified by line 46-46 in FIG. 45.

While FIGS. 38 through 39 show a 41 well plate where the bottom wall 910 of the wells is flat except for the channels, the wells may also be curved instead of flat with the center point of the grouping of anti-vacuum channels being aligned with the low point of the curved bottom wall and also spaced 9 mm from adjacent channel groupings in other wells.

Referring to FIGS. 42 through 46, the 384 well microplate 1000 includes 16 wells 1002 in each row and 24 wells in each column, and a grouping of anti-vacuum channels 1028 on the bottom wall 1010 in each well with the center point of the grouping 1028 being spaced 4.5 mm from the center point of groupings in adjacent wells 1028. In this embodiment, the desired channel width is 0.50 mm+/−0.10 mm. The configuration of the group of anti-vacuum channels needs to be slightly different in order to fit in the square wells 1002 in the 384 well microplate 1000. As shown for example in FIG. 44, the wells 1002 are square and the grouping 1028 of anti-vacuum channels 1028 includes a first pair of perpendicular channels 1022 that intersect at the center point, and a second pair of perpendicular channels 1024 rotated 45 degrees. As in other embodiments, the channels of the second pair are interrupted in the vicinity of the center point. A circular channel 1026 intersects the first 1022 and second 1024 pairs of channels.

The use of anti-vacuum channels on the bottom wall of various pipetting containers has been described in connection reservoirs, reservoir liners, microplates, microtubes and PCR tubes, but may be useful with other pipetting containers or receptacles as well. In some applications, anti-vacuum ribs may be suitable for use on the bottom wall of the pipetting containers.

The present invention is not limited to the exemplary embodiments described above so long as it is covered by the subject matter of the claims that follow.

What is claimed is:

1. A pipetting container comprising:

a receptacle for holding liquid reagents or samples for pipetting, the receptacle having a bottom wall, and at least one grouping of interconnected anti-vacuum channels on an upper surface of the bottom wall and exposed upwardly into the receptacle in which liquid sample or liquid reagent is held for pipetting;

wherein the upper surface of the bottom wall of the receptacle is hydrophilic; and further wherein the container is a disposable liner that is configured to sit in a reusable base, and said liner comprises multiple upstanding walls that separate the container receptacle into multiple separate basins with each upstanding wall having a bottom end that is sealed with the bottom wall of the container receptacle, and further wherein the upper surface of the bottom wall includes multiple groupings of interconnected anti-vacuum channels on the upper surface of the bottom wall in each of the multiple separate basins.

2. The pipetting container according to claim 1 wherein the receptacle is made from one of molded polystyrene or molded polypropylene and is corona treated so that the upper surface of the bottom wall of the receptacle has increased wettability compared to the upper surface of the bottom wall of the receptacle before treating.

3. The pipetting container according to claim 1 wherein the channels have a width of 0.5 mm+/−0.1 mm.

4. A pipetting container comprising:

a receptacle for holding liquid reagents or samples for pipetting, the receptacle having a bottom wall, and at least one grouping of interconnected anti-vacuum channels on an upper surface of the bottom wall and exposed upwardly into the receptacle in which liquid sample or liquid reagent is held for pipetting; wherein the upper surface of the bottom wall of the receptacle is hydrophilic;

the container is a laboratory tube having a cylindrical sidewall and a single grouping of interconnected anti-vacuum channels on the upper surface of the bottom wall;

at least a portion of the upper surface of the bottom wall is flat, and the portion of the upper surface of the bottom wall with the single grouping of interconnected anti-vacuum channels is flat except for the interconnected anti-vacuum channels;

the single grouping of interconnected anti-vacuum channels on the bottom wall contains a first pair of perpendicular and intersecting channels with the intersection of the channels defining a center point for the grouping, a second pair of perpendicular channels rotated 45° from the first pair, said second pair of channels being aligned to intersect at said center point but interrupted in the vicinity of the center point, and at least one circular channel that intersects each of the channels of the first and second pair of perpendicular and intersecting channels;

the at least one circular channel comprises an inner circular channel and an outer circular channel and each of the inner and the outer circular channels intersects each of the channels of the first and second pair of perpendicular and intersecting channels; and the pipetting container further comprises additional channels extending from the inner circular channel through the outer circular channel.

5. The pipetting container according to claim 1 wherein:

the reusable base has an outside wall flange dimensioned to fit into nests configured to hold SBS formatted well plates and reservoirs; and the bottom wall of the disposable liner has a generally rectangular shape configured to enable a matrix of pipette tips to aspirate liquid from the multiple separate basin contemporaneously, or to alternatively enable a row of pipette tips to aspirate from a single basin at a given time.

6. The pipetting container as recited in claim 5 wherein:

the bottom wall of the disposable liner contains a matrix of 96-format groupings of anti-vacuum channels arranged in twelve rows and eight columns with a center point for each grouping spaced 9 mm from the center point of adjacent 96-format anti-vacuum channel groupings;

the bottom wall of the disposable liner also contains a matrix of 384-format groupings of anti-vacuum channels with a center point for each grouping spaced 4.5 mm from center point of adjacent 384-format groupings, wherein each 96-format grouping is interconnected with four 384-format anti-vacuum channel groupings; and the sealed walls separate the container receptacle into separate basins that contain at least one row or at least one column of 96-format anti-vacuum channel groupings.

7. The pipetting container as recited in claim 6 wherein each 384-format anti-vacuum channel grouping on the bottom wall contains a first pair of perpendicular and intersecting channels with the intersection of the channels defining a center point for the grouping, and a second pair of perpendicular channels rotated 45° from the first pair, said second pair of channels being aligned to intersect at said center point but interrupted in the vicinity of the center point, and at least one circular channel that intersects each of the channels of the first and second pair of perpendicular and intersecting channels.

8. The pipetting container as recited in claim 1 wherein each of the multiple groupings of interconnected anti-vacuum channels in each of the respective separate basins are interconnected to one another.

9. The pipetting container according to claim 4 wherein the channels have a depth of about 0.3 mm+/−0.1 mm.

* * * * *